(12) United States Patent
Hirota

(10) Patent No.: US 9,489,723 B2
(45) Date of Patent: Nov. 8, 2016

(54) IMAGE SIGNAL PROCESSING APPARATUS, IMAGE SIGNAL PROCESSING METHOD AND PROGRAM TO SUPPRESS COLOR SHIFT CAUSED BY LENS DISTORTION

(71) Applicant: Sony Corporation, Tokyo (JP)

(72) Inventor: Yoichi Hirota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 377 days.

(21) Appl. No.: 13/920,409

(22) Filed: Jun. 18, 2013

(65) Prior Publication Data

US 2014/0009368 A1 Jan. 9, 2014

(30) Foreign Application Priority Data

Jul. 3, 2012 (JP) ................. 2012-149849

(51) Int. Cl.
*G06T 5/00* (2006.01)

(52) U.S. Cl.
CPC ............... *G06T 5/003* (2013.01); *G06T 5/006* (2013.01); *G06T 2207/10021* (2013.01); *G06T 2207/10024* (2013.01)

(58) Field of Classification Search
None
See application file for complete search history.

(56) References Cited

U.S. PATENT DOCUMENTS

| 2009/0190008 A1* | 7/2009 | Kasahara | G06T 3/4015 348/242 |
| 2009/0290198 A1* | 11/2009 | Hamano | G02B 5/205 358/475 |
| 2010/0090929 A1* | 4/2010 | Tsujimoto | G06T 5/006 345/7 |
| 2010/0166305 A1* | 7/2010 | Song | G06T 5/006 382/167 |

FOREIGN PATENT DOCUMENTS

JP 2011-145488 A 7/2011

* cited by examiner

*Primary Examiner* — David D Davis
(74) *Attorney, Agent, or Firm* — Chip Law Group

(57) ABSTRACT

Provided is an image signal processing apparatus including multiple color support distortion correcting units receiving a color signal of a correction target image, performing image distortion correction of a color based on a lens distortion characteristic and generating a correction image supporting the color. Each of the multiple color support distortion correcting units performs processing of receiving a reference signal indicating a pixel position in an input image applied to calculate a pixel value of an output correction image, and setting a pixel value of the pixel position indicated by the reference signal in the input image as an output pixel value.

12 Claims, 25 Drawing Sheets

FIG. 6
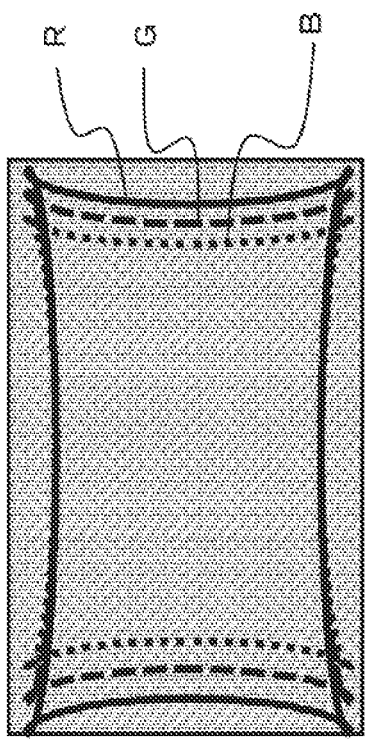
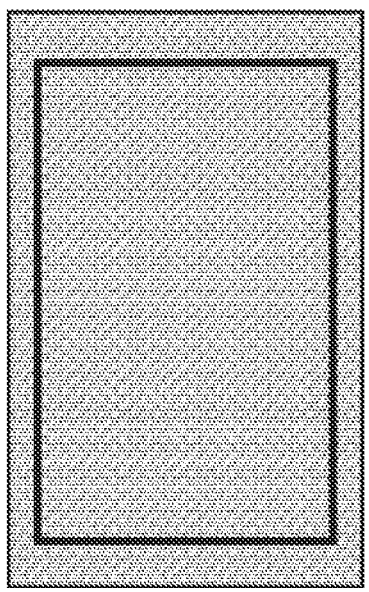

FIG. 14
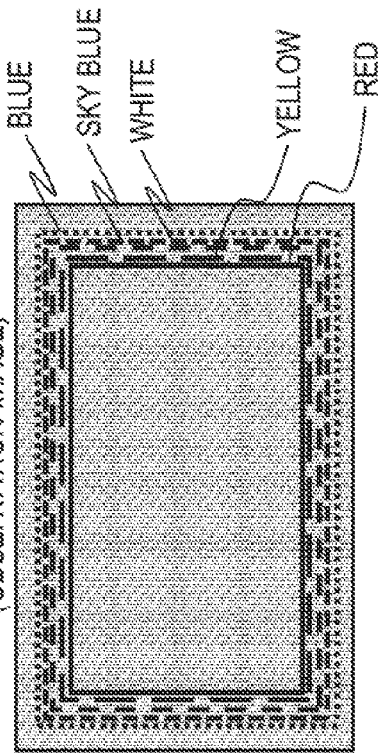
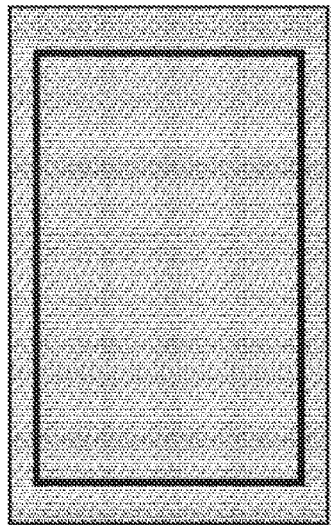
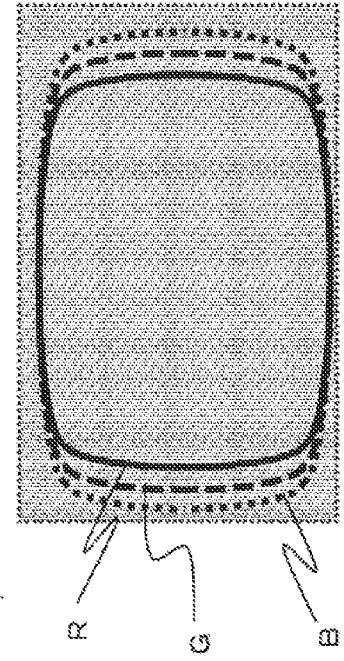

FIG. 23
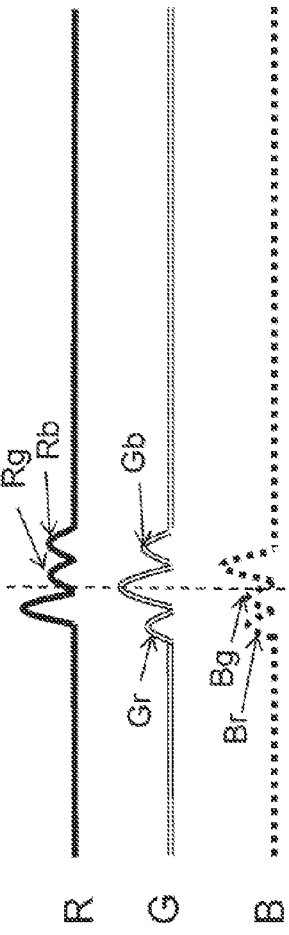
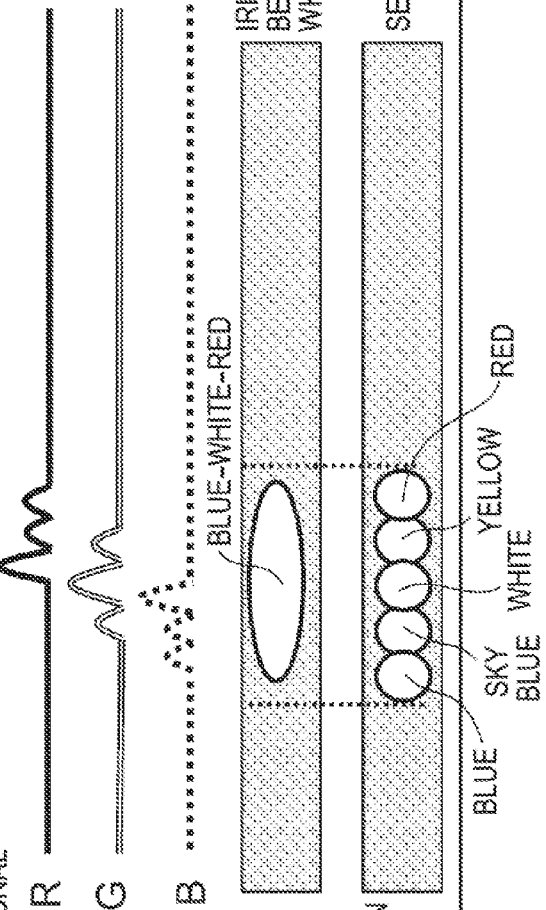

FIG. 25
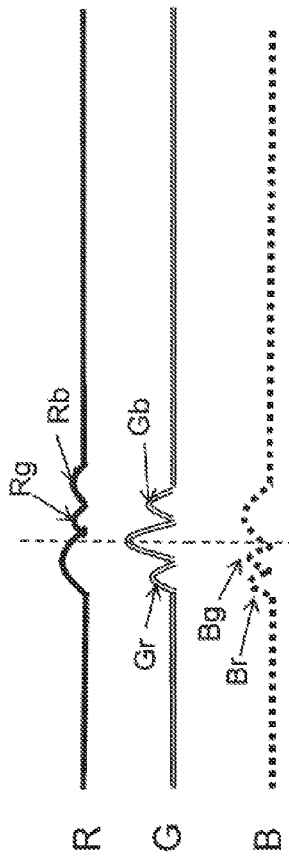
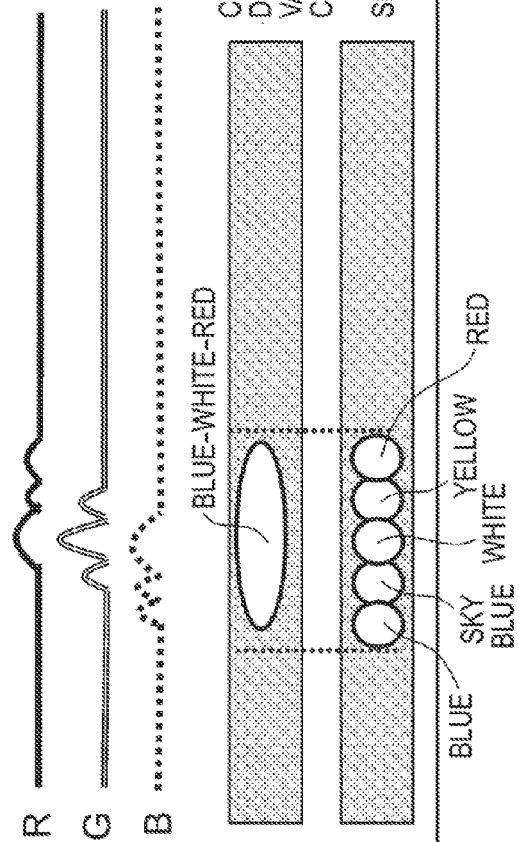

IMAGE SIGNAL PROCESSING APPARATUS, IMAGE SIGNAL PROCESSING METHOD AND PROGRAM TO SUPPRESS COLOR SHIFT CAUSED BY LENS DISTORTION

CROSS-REFERENCE TO RELATED APPLICATION

The present application claims priority from Japanese Patent Application No. JP 2012-149849 filed in the Japanese Patent Office on Jul. 3, 2012, the entire content of which is incorporated herein by reference.

BACKGROUND

The present disclosure relates to an image signal processing apparatus, an image signal processing method and a program. Especially, the present disclosure relates to an image signal processing apparatus, image signal processing method and program that perform processing of suppressing color shift caused in a displaying unit.

There is widely known a displaying apparatus mounted on a head to view an image, that is, a head mount display (HMD). The head mount display has an optical unit for each of right and left eyes and is configured to be able to control the senses of sight and hearing when it is used with headphones. When it is configured so as to be completely cut off from the outside world at the time it is attached to the head, the virtual reality is increased at the time of looking and listening. Also, the head mount display can reflect different images to right and left eyes, and, when images with disparity are displayed to the right and left eyes, it is possible to present a 3D image.

As display units for the right and left eyes on the head mount display, it is possible to use a display panel of high resolution including, for example, a liquid crystal and an organic EL (Electro-Luminescence) device. Also, if an adequate angle of view in an optical system is set and the multichannel is realized by headphones, it is possible to realize the sense of presence similar to looking and listening in a movie theater.

The displaying unit outputs wavelength light of various colors corresponding to an image and the user (or observer) observes the output image of the displaying unit by right and left eyes.

Also, as the related art disclosing a structure and principle of the head mount display, for example, JP 2011-145488A is provided.

The displaying units for right and left eyes on the head mount display include a combination of a display panel and a lens. In such an image display device, there is a case where color shift occurs in an observation image due to the distortion of the lens or the like. To be more specific, for example, in a pixel which should be originally observed as a white (W) color produced by equally mixing the colors of RGB, there is a case where color shift occurs, which is observed as if the colors of RGB are gradually shifted and arranged.

SUMMARY

The present disclosure is made in view of the above-described, for example. Especially, there are provided an image signal processing apparatus, image signal processing method and program that can suppress color shift caused by lens distortion or the like and display a color image of high quality.

According to a first embodiment of the present disclosure, there is provided an image signal processing apparatus including multiple color support distortion correcting units receiving a color signal of a correction target image, performing image distortion correction of a color based on a lens distortion characteristic and generating a correction image supporting the color. Each of the multiple color support distortion correcting units performs processing of receiving a reference signal indicating a pixel position in an input image applied to calculate a pixel value of an output correction image, and setting a pixel value of the pixel position indicated by the reference signal in the input image as an output pixel value. At least one of the multiple color support distortion correcting units performs processing of applying a correction reference signal, which is set to have a small difference with another color reference signal, and generating a correction image in which a pixel value of a pixel position indicated by the correction reference signal in the input image is set as an output pixel value.

Further, the image signal processing apparatus may further include a distortion difference suppression reference signal generating unit calculating a difference absolute value between reference signals of two different colors, applying a correction amount determined according to the calculated difference absolute value and generating a correction reference signal supporting one of the two different colors. The color support distortion correcting unit applying the correction reference signal may perform processing of applying the correction reference signal generated by the distortion difference suppression reference signal generating unit.

Further, the distortion difference suppression reference signal generating unit may generate a correction reference signal in which a difference between the reference signals of the two different colors is set to be small.

Further, the distortion difference suppression reference signal generating unit may generate a correction reference signal in which, as the difference absolute value between the reference signals of the two different colors is larger, a difference reduction amount with the reference signals of the two different colors is set to be larger.

Further, the color support distortion correcting unit applying the correction reference signal may further generate the correction image by performing high-pass reduction processing on an image signal including a pixel value calculated by applying a correction reference signal.

Further, the image signal processing apparatus may further include a filter band calculating unit calculating a difference absolute value between reference signals of two different colors and generating a filter band control signal to perform the high-pass reduction processing according to the calculated difference absolute value. The color support distortion correcting unit applying the correction reference signal may generate the correction image by performing high-pass reduction processing according to the filter band control signal calculated by the filter band calculating unit.

Further, the filter band calculating unit may generate a filter band control signal in which, as the difference absolute value between the reference signals of the two different colors is larger, a high-pass reduction rate is set to be higher.

Further, by linear interpolation processing, the color support distortion correcting unit may generate a correction image in which a pixel value of a pixel position indicated by a reference signal or correction reference signal in an input image is set as an output pixel value.

Further, the multiple color support distortion correcting units may include an R distortion correcting unit. The R distortion correcting unit receives an R signal of the correction target image, and generates and outputs a correction image supporting the R signal. Further, the multiple color support distortion correcting units may include a G distortion correcting unit. The G distortion correcting unit receives a G signal of the correction target image, and generates and outputs a correction image supporting the G signal. Furthermore, the multiple color support distortion correcting units may include a B distortion correcting unit. The B distortion correcting unit receives a B signal of the correction target image, and generates and outputs a correction image supporting the B signal.

Further, only the R distortion correcting unit and the B distortion correcting unit may generate a correction image in which a pixel value of a pixel position indicated by the correction reference signal in an input image is set as an output pixel value.

Further, only the R distortion correcting unit and the B distortion correcting unit may generate the correction image by performing high-pass reduction processing on an image signal including a pixel value calculated by applying a correction reference signal.

Further, according to a second embodiment of the present disclosure, there is provided a head mount display apparatus including an image signal processing unit performing image signal processing.

Further, according to a third embodiment of the present disclosure, there is provided an image signal processing method performed in an image signal processing apparatus, the image signal processing apparatus including multiple color support distortion correcting units receiving a color signal of a correction target image, performing image distortion correction of a color based on a lens distortion characteristic and generating a correction image supporting the color. Each of the multiple color support distortion correcting units performs processing of receiving a reference signal indicating a pixel position in an input image applied to calculate a pixel value of an output correction image, and setting a pixel value of the pixel position indicated by the reference signal in the input image as an output pixel value. At least one of the multiple color support distortion correcting units performs processing of applying a correction reference signal, which is set to have a small difference with another color reference signal, and generating a correction image in which a pixel value of a pixel position indicated by the correction reference signal in the input image is set as an output pixel value.

Further, according to a fourth embodiment of the present disclosure, there is provided a program for causing image processing to be performed in an image signal processing apparatus, the image signal processing apparatus including multiple color support distortion correcting units receiving a color signal of a correction target image, performing image distortion correction of a color based on a lens distortion characteristic and generating a correction image supporting the color. The program causes each of the multiple color support distortion correcting units to perform processing of receiving a reference signal indicating a pixel position in an input image applied to calculate a pixel value of an output correction image, and setting a pixel value of the pixel position indicated by the reference signal in the input image as an output pixel value. The program causes at least one of the multiple color support distortion correcting units to perform processing of applying a correction reference signal, which is set to have a small difference with another color reference signal, and generating a correction image in which a pixel value of a pixel position indicated by the correction reference signal in the input image is set as an output pixel value.

Note that the program according to the embodiment of the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

According to a configuration of an embodiment of the present disclosure, there is realized a configuration that can suppress the image distortion of each color based on lens distortion and color shift due to false light caused by white light scattering of a display panel.

To be more specific, it includes multiple color support distortion correcting units receiving each color signal of a correction target image, performing image distortion correction of each color based on a lens distortion characteristic and generating the correction image of each color. Each of the multiple color support distortion correcting units receives an input of a reference signal indicating a pixel position in an input image applied to calculate each pixel value of an output correction image, and sets a pixel value of the pixel position indicated by the reference signal in the input image as an output pixel value. At least one of the multiple color support distortion correcting units applies a correction reference signal, which is set to have a small difference with other color reference signals, sets a pixel value of a pixel position indicated by the correction reference signal in the input image as an output pixel value, and further generates and outputs a correction image to which band control as high-pass reduction processing is applied.

By the configuration, there is realized a configuration that can suppress the image distortion of each color based on lens distortion and color shift due to false light caused by white light scattering of a display panel.

BRIEF DESCRIPTION OF THE DRAWINGS

FIG. 6 is a diagram illustrating the image distortion of each of RGB caused by a lens;

FIG. 14 is a diagram illustrating a problem of an observation image, which is caused by false light;

FIG. 23 is a diagram illustrating effects of band adjustment by an image signal processing unit of an image signal processing apparatus of the present disclosure and processing performed by an R distortion correcting unit;

FIG. 25 is a diagram illustrating effects of band adjustment by an image signal processing unit of an image signal processing apparatus of the present disclosure and processing performed by an R distortion correcting unit.

DETAILED DESCRIPTION OF THE EMBODIMENT(S)

Figure 1:
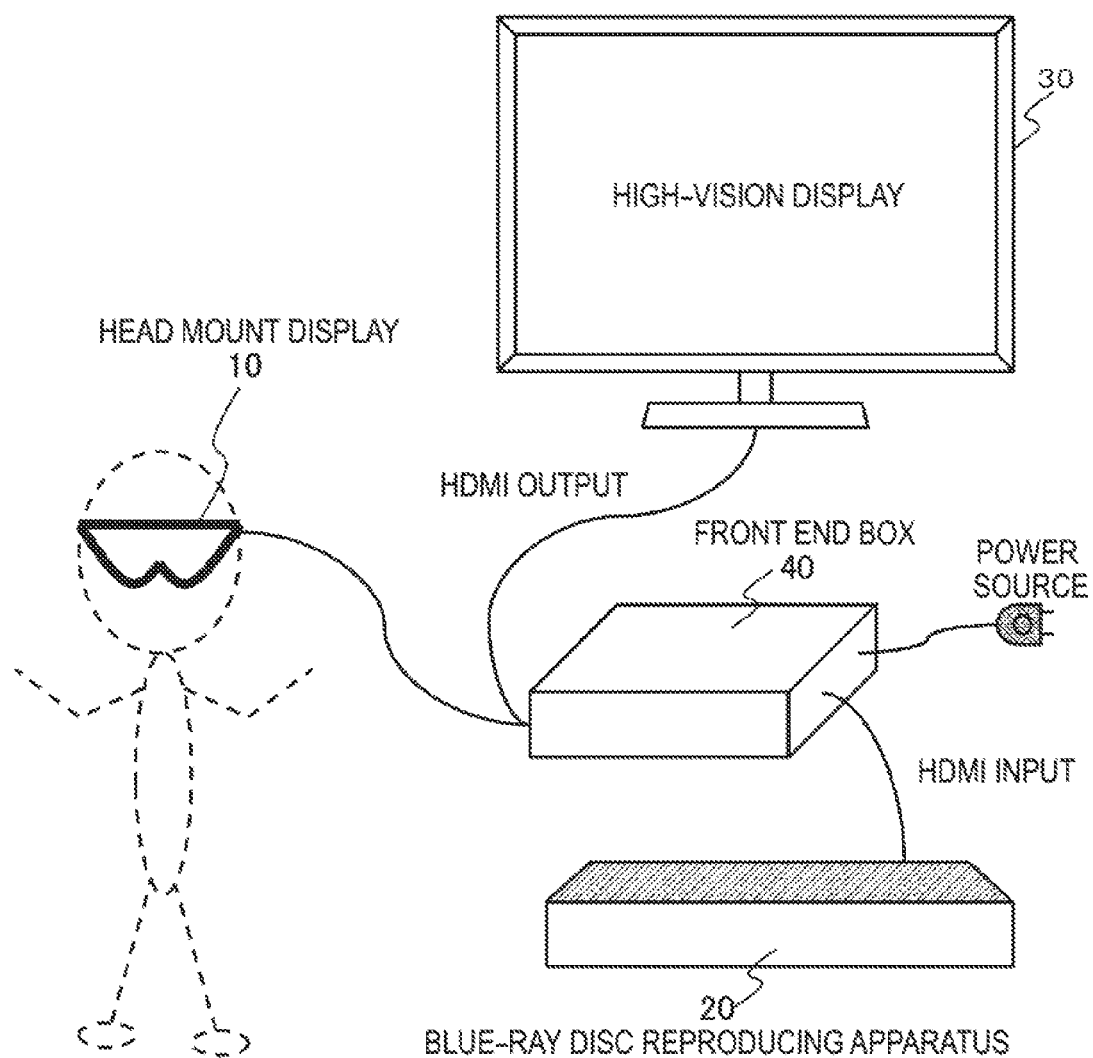
FIG. 1 is a diagram illustrating a system configuration example using an image signal processing apparatus of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In the following, an image signal processing apparatus, image signal processing method and program of the present disclosure are explained in detail with reference to the drawings. Here, the explanation is given according to the following items.

1. Configuration of head mount display and occurrence of color shift
2. Regarding processing of suppressing occurrence of color shift by false light
   2.1 Regarding entire configuration of head mount display
   2.2 Regarding details of processing performed by image signal processing unit
   2.3 Regarding effects based on application of correction reference signal and application of low-pass filter
3. Summary of the present disclosure 1. Configuration of Head Mount Display and Occurrence of Color Shift First, an outline of the head mount display configuration and color shift occurrence is explained.

FIG. 1 schematically illustrates a configuration of an image display system including the head mount display. The system illustrated in FIG. 1 includes a head mount display 10 itself, a Blu-ray (a digital optical disc data storage format) Disc reproducing apparatus 20 as a source of view content, a high-vision display (e.g. HDMI (High-Definition Multimedia Interface) television) 30 as other output destination of playback content of the Blu-ray Disc reproducing apparatus 20, and a front end box 40 that performs processing of an AV signal output from the Blu-ray Disc reproducing apparatus 20.

The front end box 40 corresponds to an HDMI repeater that, when receiving an HDMI input of an AV signal output from the Blu-ray Disc reproducing apparatus 20, performs signal processing and HDMI output, for example. Also, the front end box 40 also denotes a two-way output switcher that switches the output destination of the Blu-ray Disc reproducing apparatus 20 to one of the head mount display 10 and the high-vision display 30. In the illustrated example, although the front end box 40 has two outputs, it may have three outputs or more. However, in the front end box 40, the output destination of AV signals is exclusive and the highest priority is assigned to an output to the head mount display 10.

An HDMI cable connects between the Blu-ray Disc reproducing apparatus 20 and the front end box 40 and between the front end box 40 and the high-vision display 30. Although it is possible to employ a configuration in which an HDMI cable connects between the front end box 40 and the head mount display 10, cables of other specifications may be used to perform serial transfer of AV signals. However, it is assumed that AV signals and power are supplied by one cable connecting between the front end box 40 and the head mount display 10, and the head mount display 10 can acquire drive power through this cable.

The head mount display 10 includes independent displaying units for right and left eyes. Each displaying unit uses, for example, an organic EL device. Also, the right and left displaying units each is equipped with a lens block including a wide viewing angle optical system with low distortion and high resolution.

Figure 2:
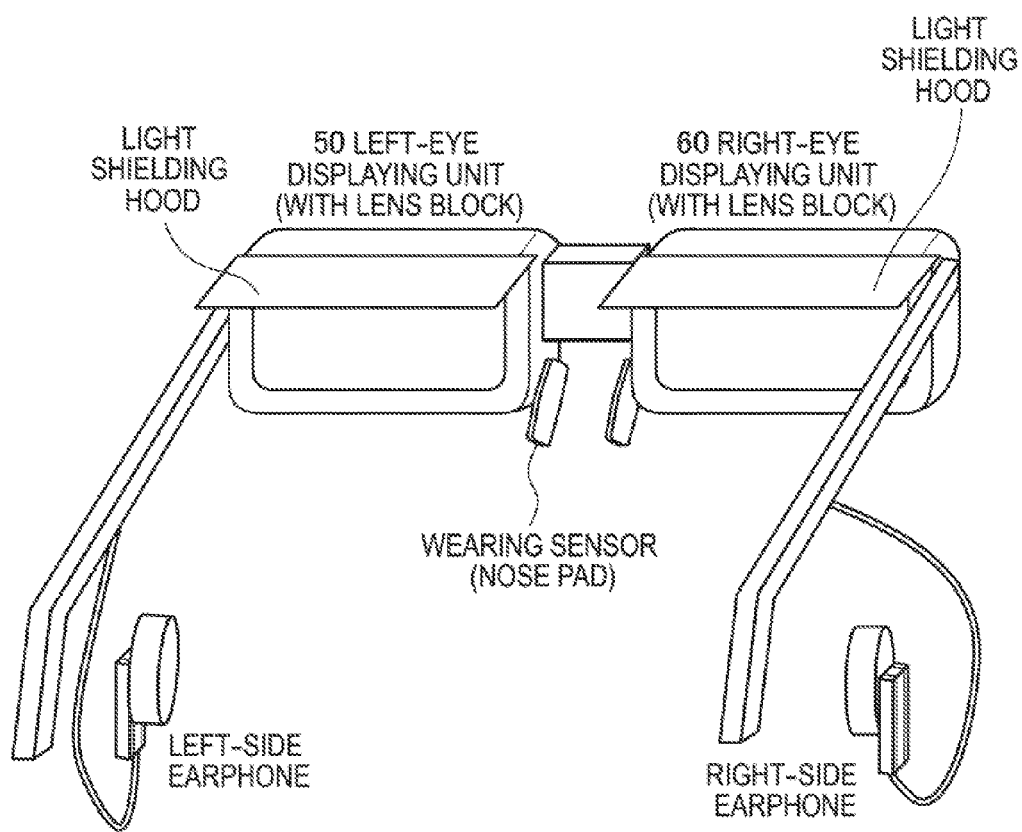
FIG. 2 is a diagram illustrating an outline configuration example of a head mount display as an example of an image signal processing apparatus of the present disclosure.

FIG. 2 illustrates an appearance configuration example of the head mount display 10. In a frame of the of the head mount display, a left-eye displaying unit 50 and a right-eye displaying unit 60 are supported together with the lens blocks (described above). Also, the left side earphone and the right side earphone are attached to right and left temples. In the illustrated example, a nose pad (or nose cover) also serves as a wearable sensor and has a system of detecting the wearing when the user's (or viewer's) nose end contacts with the nose pad. The wearing sensor is turned on when the user's nose end contacts with the nose pad, and the wearing sensor is turned off when it is separated from the nose end.

As illustrated in FIG. 2, light shielding hoods are attached above the left-eye displaying unit 50 and the right-eye displaying unit 60. In a state where the user wears the head mount display 10, the right and left eyes are blocked from environmental light by the light shielding hoods, and it is possible to maintain a virtually constant viewing environment. That is, the head mount display 10 is formed as a device that directly covers the user's eyes.

Figure 3:
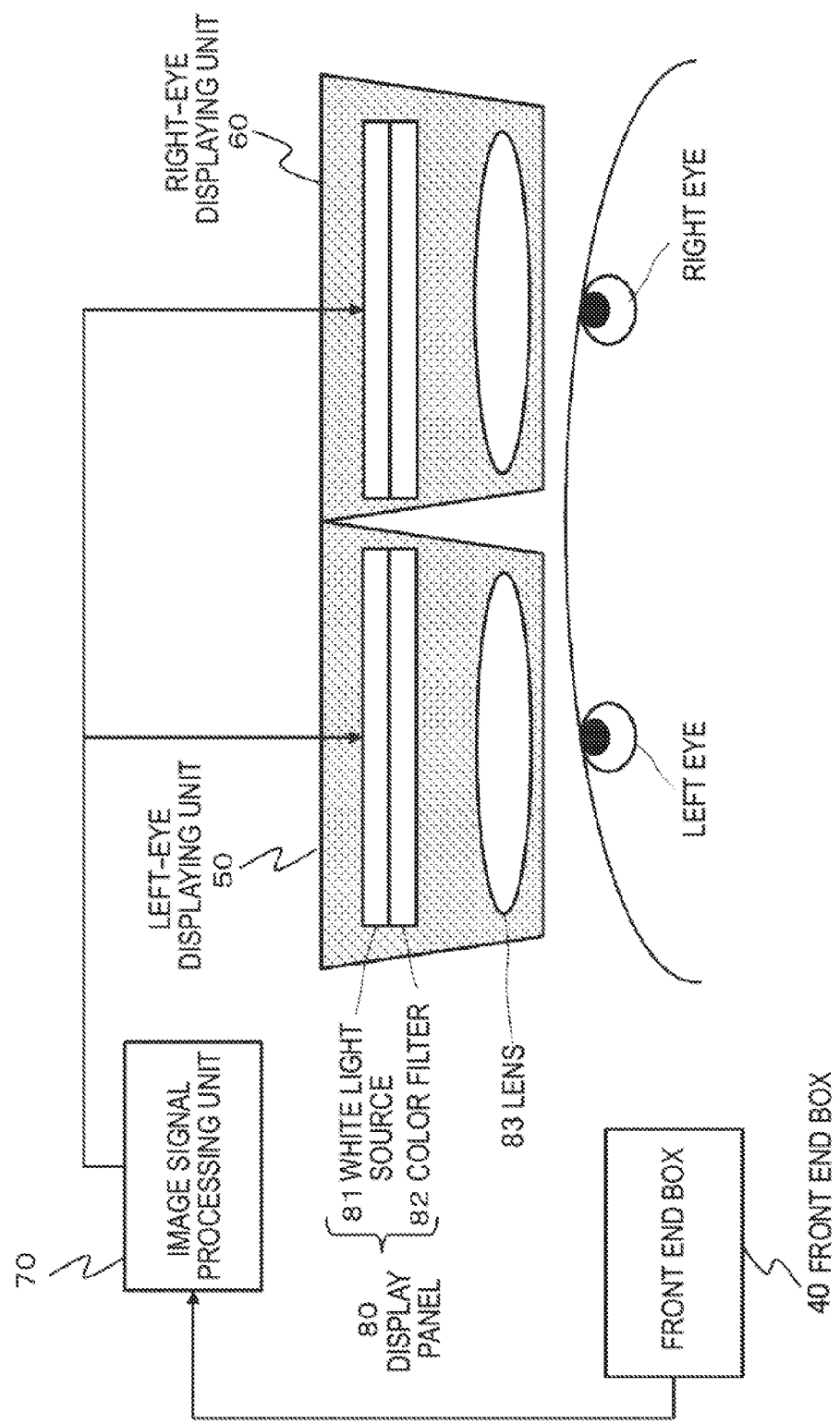
FIG. 3 is a diagram illustrating a configuration example of a head mount display as an example of an image signal processing apparatus of the present disclosure.

FIG. 3 is a view in which the head mount display 10 is seen from the upper surface.

The left-eye displaying unit 50 and the right-eye displaying unit 60 have the same configuration.

A configuration example of the left-eye displaying unit 50 is explained. As illustrated in the figure, the left-eye displaying unit 50 includes a display panel 80 formed with a white light source 81 and a color filter 82, and a lens 83. An HDMI output corresponding to content such as a movie output from the front end box 40 is input in an image signal processing unit 70. Here, this image signal processing unit 70 is a configuration held in the head mount display 10.

A control signal based on an image signal is output from the image signal processing unit 70 to control the white light source 81. The light output by the white light source 81 reaches the user's (or observer's) eye through the color filter 82 and the lens 83.

However, in the display device having a configuration combining the display panel 80 and the lens 83 as above, there is a case where color shift occurs in an observation image due to distortion of the lens 83 or the like.

For example, in the case of displaying W (White) with respect to one pixel on the display panel, by overlapping the wavelength light of each of RGB over one pixel and outputting the result, it is possible to display the white.

However, color shift may occur where, for example, the output positions of RGB are shifted due to distortion of the lens and RGB colors are output to slightly shifted positions.

It is desirable to provide a method of canceling distortion by partially shifting an image in each area of the display panel.

Figure 4:
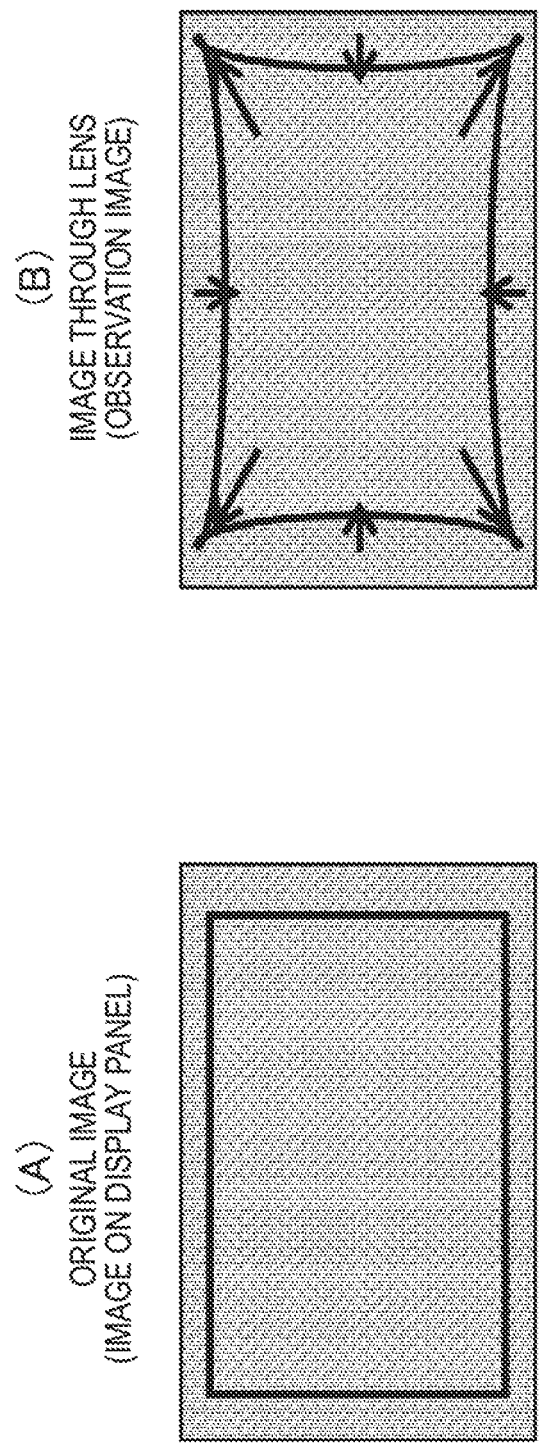
FIG. 4 is a diagram illustrating image distortion caused by a lens.

FIG. 4 illustrates an example of an observation image produced by lens distortion.

FIG. 4 illustrates an example of two images of: (A) an original image (i.e. image on the display panel); and (B) an image through a lens (i.e. observation image).

By an image signal output by the image signal processing unit illustrated in FIG. 3, a correct image illustrated in FIG. 4(A) corresponding to original content is displayed on the display panel 80 (i.e. the display panel 80 formed with the white light source 81 and the color filter 82). The quadrangle illustrated in FIG. 4(A) illustrates the profile of one given display object.

However, when this image is observed through the lens arranged in front of the user's (or observer's) eye, distortion due to lens distortion occurs, and, as illustrated in FIG. 4(B), it is observed as if the originally quadrangular object is transformed.

Such a difference between the original image and the observation image is based on a lens characteristic (i.e. so-called distortion characteristic).

The lens distortion characteristic can be measured in advance, and, for example, in the case of using a lens having the distortion characteristic as illustrated in FIG. 4, it is effective to perform processing of generating and outputting an image having characteristics opposite to the distortion characteristics as a correction image.

Figure 5:
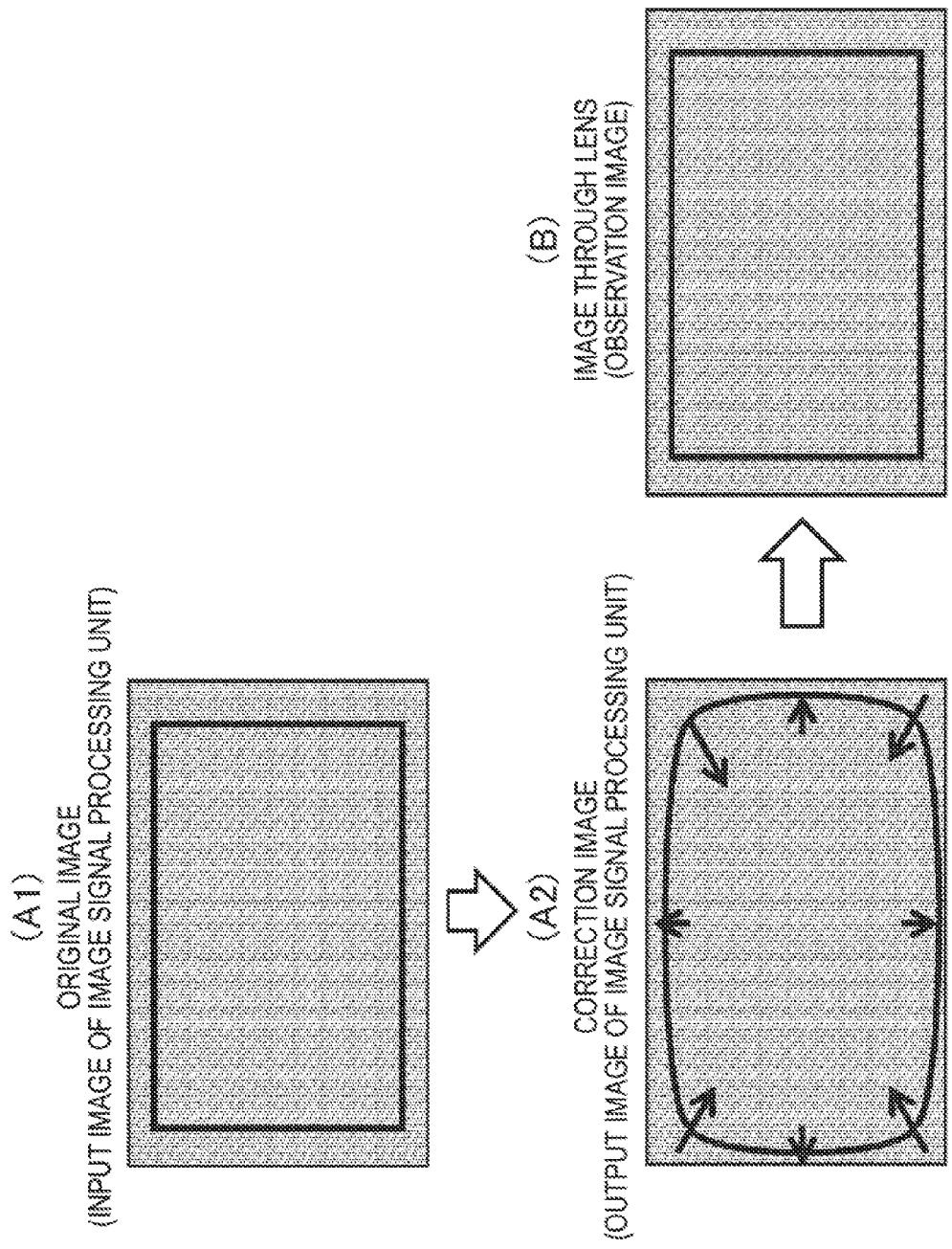
FIG. 5 is a diagram illustrating a processing example of correcting image distortion caused by a lens.

That is, as illustrated in FIG. 5, regarding an input image (A1) with respect to the image signal processing unit 70, as illustrated in (A2), the image signal processing unit 70 generates an image having characteristics opposite to the lens distortion characteristics as a correction image.

If this correction image is displayed on the display panel 80, as illustrated in FIG. 5(B), an observation image through the lens serves as an image without distortion and the user (or observer) can observe a normal image.

However, the distortion characteristic of the lens slightly changes depending on the light wavelength.

For example, in a displaying unit using RGB signals, as illustrated in FIG. 6, different distortion is caused depending on the wavelength light of each of R, G and B.

By a difference in the distortion characteristic based on such a wavelength, as explained above, a phenomenon occurs where a pixel value that should be originally observed as white (W) is not observed as white but is observed as shifted RGB colors.

Figure 7:
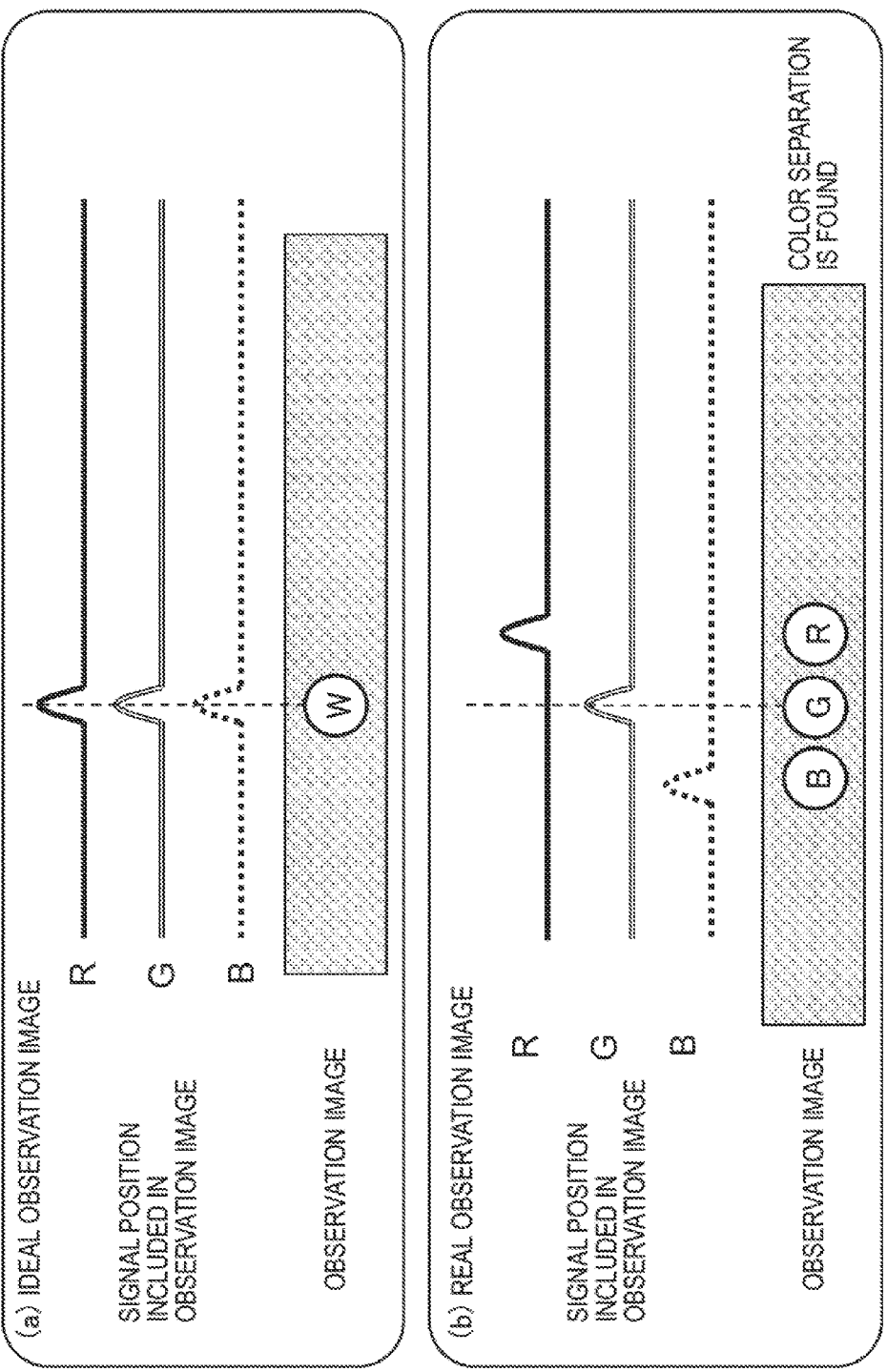
FIG. 7 is a diagram illustrating color shift in an observation image due to the image distortion of each of RGB caused by a lens.

FIG. 7 is a diagram illustrating a phenomenon of this color shift. FIG. 7 illustrates an example of following two observation images.

Each of (a) an ideal observation image and (b) a real observation image shows an example of output signal positions of RGB signals included in the observation image and an observed image.

These are examples where they are output images thorough lenses.

In the ideal observation image illustrated in FIG. 7(a), the output positions of RGB colors are arranged in line and a pixel value observed by the user is white (W).

However, in the real observation image illustrated in FIG. 7(b), the signal output positions of RGB colors are shifted and a pixel value observed by the user is not white (W) but is an image in which three colors of RGB are arranged.

Thus, since a distortion characteristic of a lens changes depending on a light wavelength, if the same distortion correction is performed for RGB, relative RGB positions remain in a shifted state. It is preferable to perform correction processing unique to each of color units of RGB at the time of generating a correction image.

Figure 8:
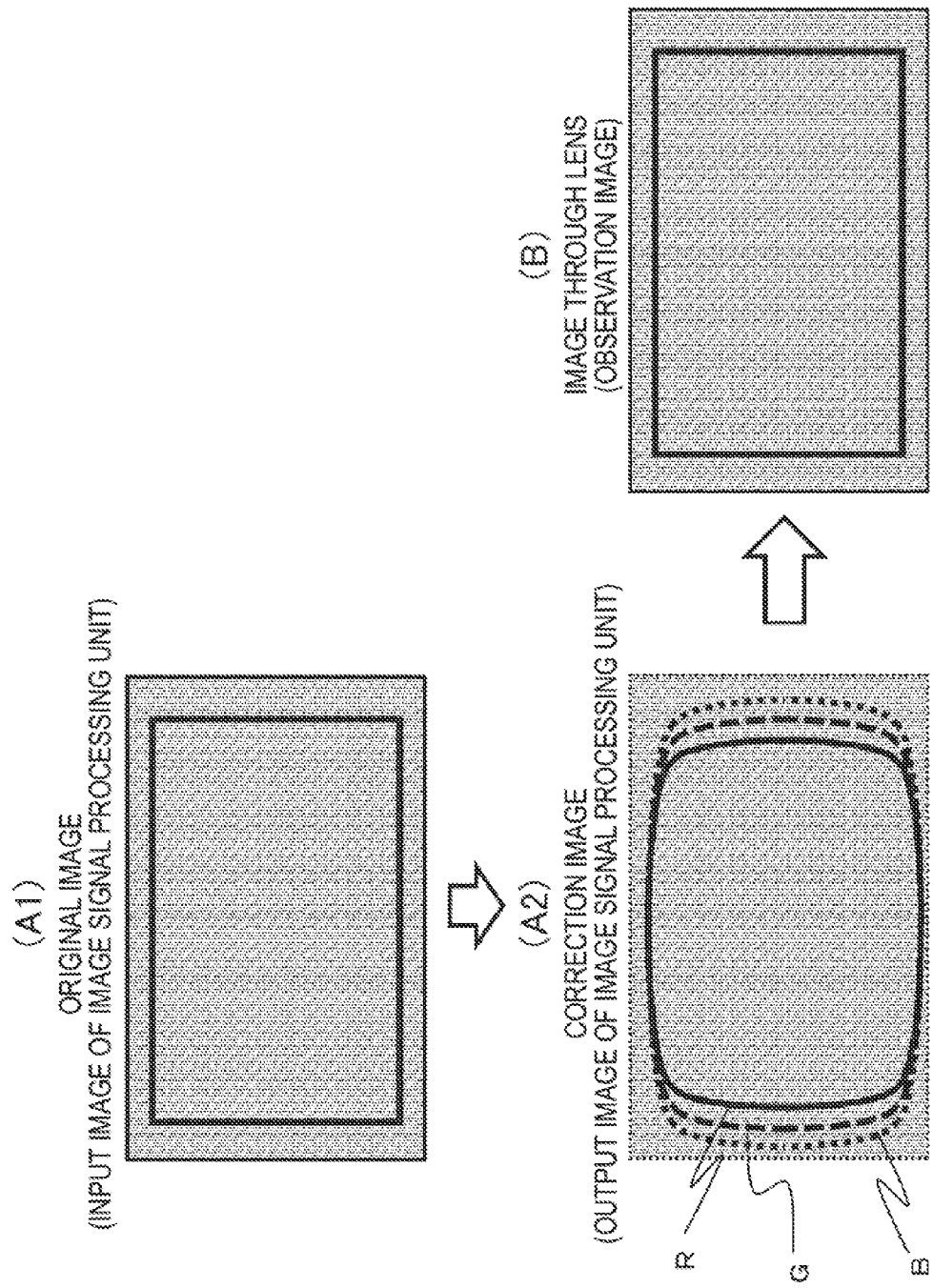
FIG. 8 is a diagram illustrating a processing example of correcting the image distortion of each of RGB caused by a lens.

That is, it is effective to perform processing as illustrated in FIG. 8. As illustrated in FIG. 8, regarding an input image (A1) with respect to the image signal processing unit 70, as illustrated in (A2), an image having characteristics opposite to the lens distortion characteristics unique to RGB wavelength light is generated as a correction image.

This correction image illustrated in FIG. 8(A2) is an image in which a characteristic opposite to the distortion characteristic of each color of RGB in FIG. 6(B) explained above is set for each of RGB.

When this correction image is displayed on the display panel 80, as illustrated in FIG. 8(B), an observation image through a lens serves as an image without distortion and the user (or observer) can observe a normal image without color shift.

Figure 9:
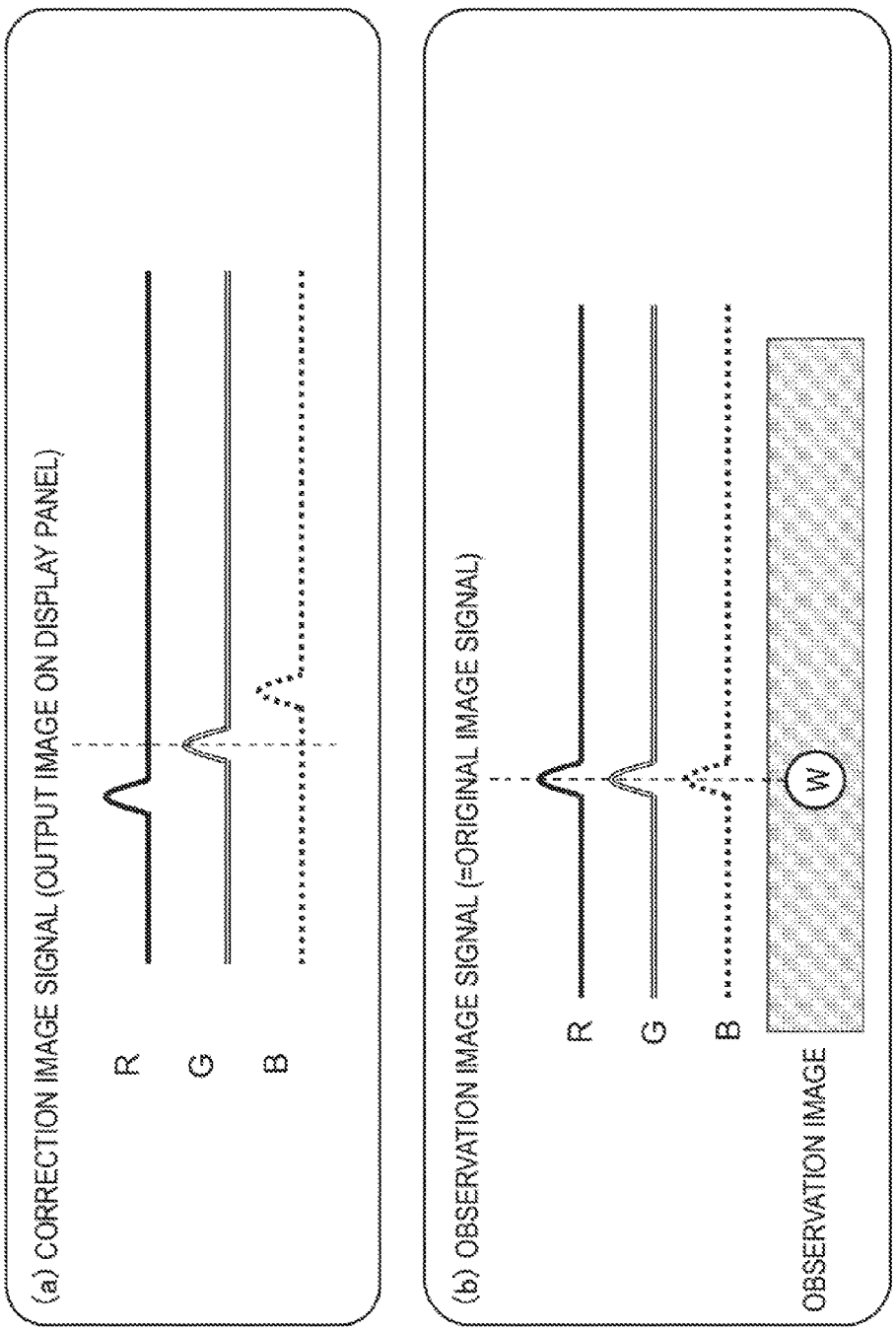
FIG. 9 is a diagram illustrating a processing example of correcting the image distortion of each of RGB caused by a lens.

For example, as illustrated in FIG. 9(b), in order to cause the same white (W) pixel as an original image from which the white (W) pixel is output to be observed as an observation image, it is requested to generate, as a correction image output to the display panel 80, a correction image in which the shift amount of each of RGB is set to slightly vary as illustrated in FIG. 9(a).

An example of a signal processing configuration to generate a correction image by such correction processing in units of colors is explained with reference to FIG. 10.

Figure 10:
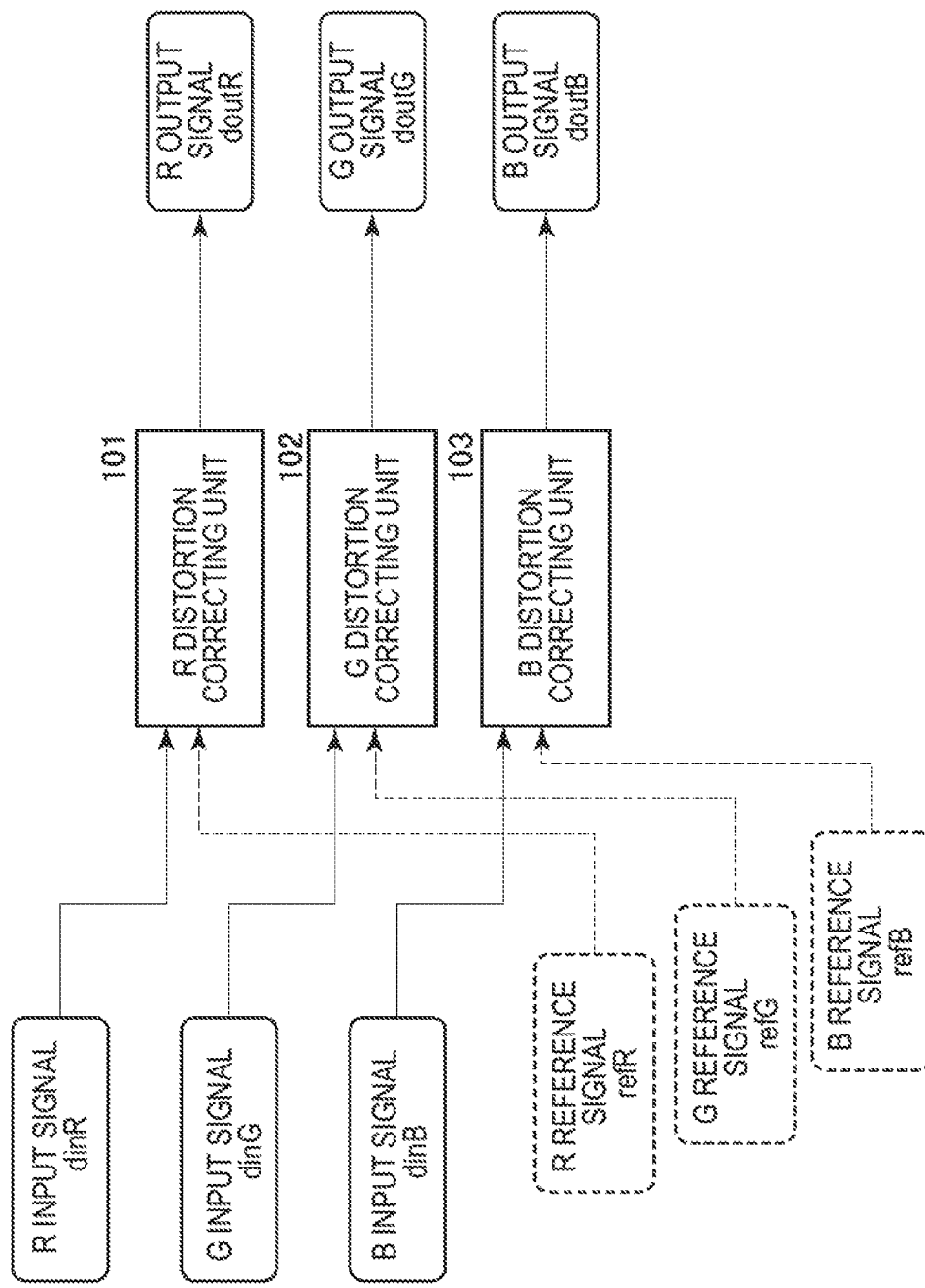
FIG. 10 is a diagram illustrating a signal processing configuration of correcting the image distortion of each of RGB caused by a lens.

As illustrated in FIG. 10, a signal processing unit includes an R distortion correcting unit 101 that performs distortion correction supporting R signals, a G distortion correcting unit 102 that performs distortion correction supporting G signals and a B distortion correcting unit 103 that performs distortion correction supporting B signals.

In the RGB distortion correcting units 101 to 103, input signals dinR, dinG and dinB and reference signals refR, refG and refB, which are unique to RGB, are input.

The input signal din denotes the pixel signal of each pixel forming a display image. For example, the pixel signals corresponding to the colors of each image frame forming input content from the front end box 40 illustrated in FIG. 1 and FIG. 3 are input in the correcting units in order.

The reference signal ref denotes a signal indicating a pixel position of an input image to be referred to at the time of generating an output signal dout of each of the RGB distortion correcting units 101 to 103.

This reference signal is a parameter based on a lens distortion characteristic of the head mount display 10 and is stored in advance in a memory in an image signal processing unit of the head mount display 10.

For example, the R reference signal refR indicates a pixel position in an input image, which corresponds to the k-th R pixel doutR(k) output by the R distortion correcting unit 101. The distance between the pixel position of the k-th R pixel doutR(k) output by the R distortion correcting unit 101 and the pixel position in the input image corresponds to a distortion amount, that is, a pixel position shift amount caused by lens distortion in the observation image.

Also, input signals and reference signals associated with only R pixel values are input in the R distortion correcting unit 101, input signals and reference signals associated with only G pixel values are input in the G distortion correcting unit 102 and input signals and reference signals associated with only B pixel values are input in the B distortion correcting unit 103.

The RGB distortion correcting units 101 to 103 generates an output signal dout by applying a pixel value of the input signal din as a correction target and the reference signal ref indicating a reference pixel position determined according to a pixel shift amount based on the distortion characteristic of each color, and outputs the output signal dout.

Each of the RGB distortion correcting units 101 to 103 applies the input image value signals din, which are input in order, and performs pixel interpolation processing of calculating pixel values of positions shifted from these input pixel positions (i.e. pixel positions shifted based on the lens distortion characteristic of each color). An image signal formed with the interpolation pixel value is output as an output signal dout.

Specific processing of the pixel value interpolation processing performed in each of the RGB distortion correcting units 101 to 103 is explained with reference to FIG. 11.

In the following, for ease of explanation, an explanation is given with an assumption that, based on a pixel value of an input image, the RGB distortion correcting units 101 to 103 perform interpolation processing of calculating a pixel value of a position shifted only in the horizontal direction. Also, an explanation is given with an assumption that linear interpolation is applied as an interpolation method. Also, although there is a case where two-dimensional interpolation processing in the horizontal and vertical directions or multi-tap interpolation processing such as cubic interpolation is performed, these items of processing can be realized by expanding processing in the one-dimensional direction explained below to the two-dimensional direction, and basic processing denotes processing based on the following explanation.

Figure 11:
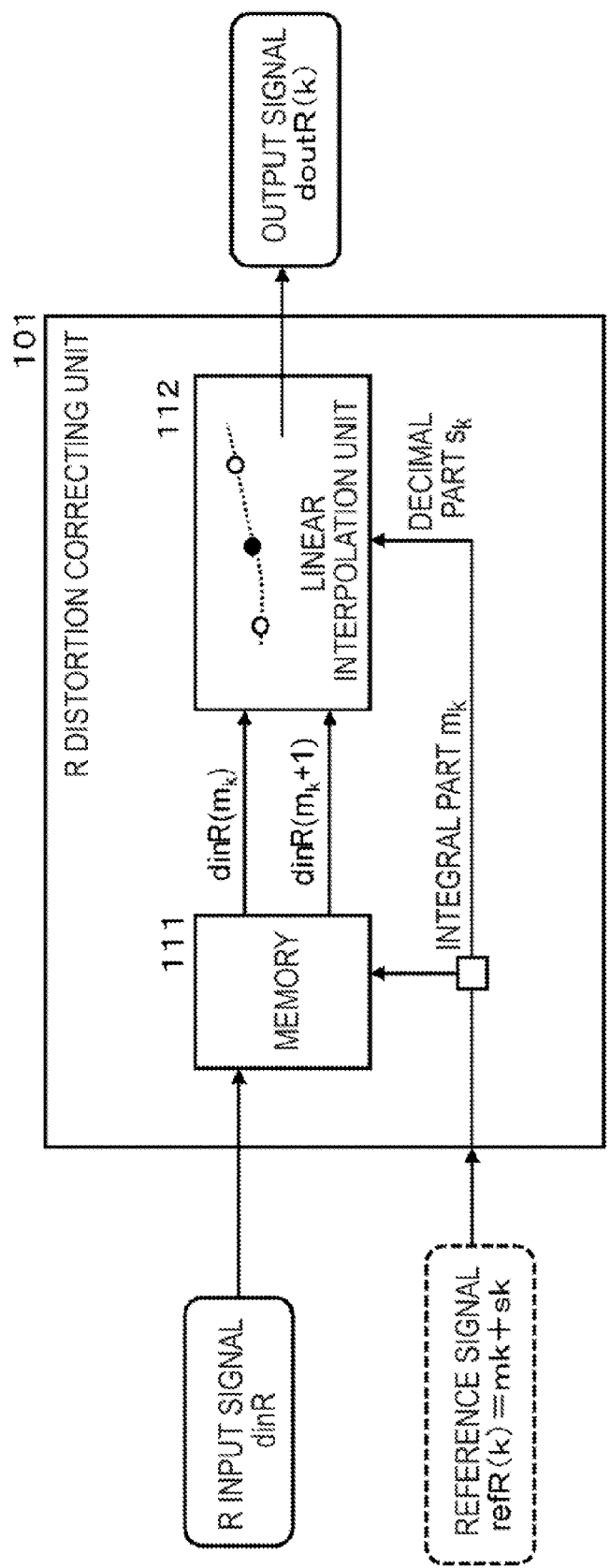
FIG. 11 is a diagram illustrating a configuration example of the distortion correcting unit supporting each color in a signal processing unit to correct the image distortion of each of RGB caused by a lens.

FIG. 11 illustrates a detailed configuration of the R distortion correcting unit 101 which is one distortion correcting unit of the RGB distortion correcting units 101 to 103 illustrated in FIG. 10. The RGB distortion correcting units 101 to 103 illustrated in FIG. 10 have the same configuration as that of the distortion correcting unit 101 illustrated in FIG. 11.

The reference signal refR(k) input in the R distortion correcting unit 101 shows a pixel position of an input image signal to be referred to, to calculate the k-th output signal doutR(k) output by the R distortion correcting unit 101.

That is, the distance between the pixel position of the k-th R pixel doutR(k) output by the R distortion correcting unit 101 and the pixel position designated by the reference signal refR(k) in the input image corresponds to a distortion amount, that is, a shift amount of the pixel position caused by lens distortion in the observation image.

However, this shift amount is not limited to an integral number matching a pixel interval. Therefore, the integral part of the reference signal refR(k) is referred to as "mk" and its decimal part is referred to as "sk."

For example, this example is an example using only pixels in the horizontal direction, and "mk" corresponds to pixel numbers 1, 2, 3, 4, 5, and so on, set in order from pixels in the left side of the horizontal pixel line.

For example, the R distortion correcting unit 101 performs processing of setting a pixel value of the k-th output R pixel doutR(k) to a pixel value of the pixel position of the input image determined by reference signal refR(k)=mk+sk.

In FIG. 11, the R input image dinR is sequentially stored in the memory 111.

From the memory 111, according to a value of mk in the reference signal refR(k)=mk+sk, pixel values dinR(mk) and dinR(mk+1) of the input image to be referred to, to calculate the k-th output signal doutR(k) output by the R distortion correcting unit 101, are acquired.

By performing linear interpolation on these pixel values dinR(mk) and dinR(mk+1) of the input image by the value of the decimal part sk in the reference signal refR(k)=mk+sk, the linear interpolation unit 112 calculates a pixel value of a pixel position in the original input image (i.e. pixel position indicated by the reference signal refR(k)=mk+sk) to be set as a pixel value of the output image signal doutR(k).

Figure 12:
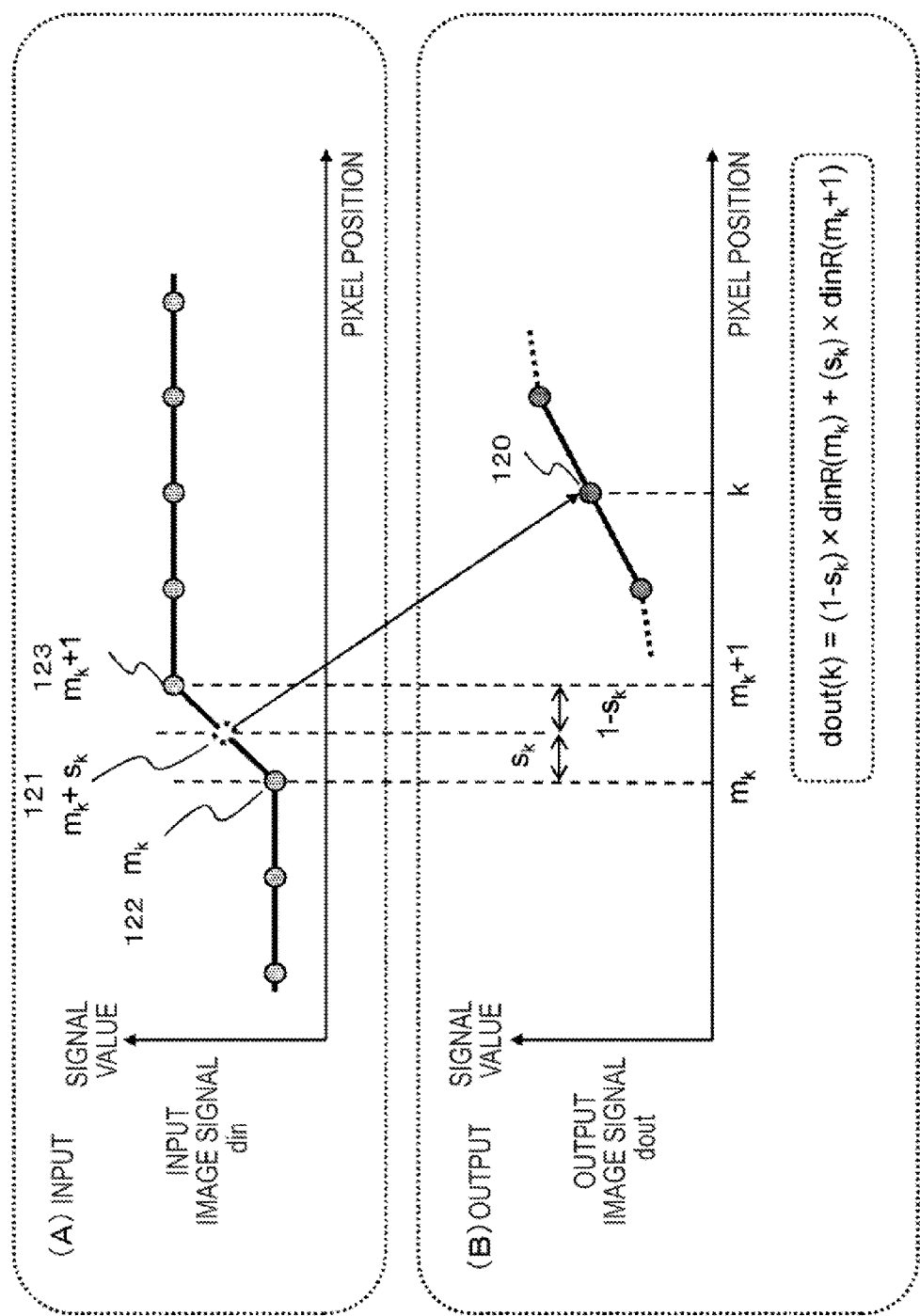
FIG. 12 is a diagram illustrating processing by a linear interpolation unit in the distortion correcting unit supporting each color in a signal processing unit to correct the image distortion of each of RGB caused by a lens.

With reference to FIG. 12, a calculation processing example of the output signal doutR(k), which is performed by the R distortion correcting unit 101, is explained.

FIG. 12 shows (A) the pixel value (din) of each pixel position of an input image with respect to R distortion correcting unit 101 and (B) the pixel value (dout) of each pixel position of an output image from the R distortion correcting unit 101.

The horizontal axis indicates the pixel position and shows (A) and (B) in the same scale.

The vertical axis indicates the input image pixel value and the output image pixel value.

For example, the pixel value doutR(k) of the k-th pixel of the output image illustrated in FIG. 12(B) is a pixel value corresponding to the pixel 120 illustrated in FIG. 12(B).

A pixel position in the input image to calculate this pixel value is determined by the reference signal refR(k)=mk+sk.

The pixel position designated by this reference signal refR(k)=mk+sk is a pixel 121 illustrated in FIG. 12(A).

However, this pixel 121 is a pixel position that is not present in the input image.

Its both sides, that is, an R pixel 122 in a pixel position of mk and an R pixel 123 in a pixel position of mk+1 are present.

By interpolation processing using these R pixel values dinR(mk) and dinR(mk+1) of the input image, the linear interpolation unit 112 calculates a pixel value corresponding to the pixel position indicated by the reference signal refR(k)=mk+sk (i.e. pixel position of the pixel 121 illustrated in FIG. 12(A)). This calculation pixel value is assumed as the pixel value doutR(k) of the k-th pixel in the output image illustrated in FIG. 12(B).

The linear interpolation unit 112 calculates the output pixel value doutR(k) in the following equation.

$$doutR(k)=(1-sk) \times dinR(mk)+(sk) \times dinR(mk)$$

The linear interpolation unit 112 calculates the output pixel value doutR(k) according to the above equation.

Although a calculation processing example of the R pixel value of a correction image in the R distortion correcting unit 101 has been explained with reference to FIG. 11 and FIG. 12, since it is different from the G distortion correcting unit 102 and the B distortion correcting unit 103 only in that G and B are processed pixels, the pixel values of G and B pixels in the output image are calculated and output by similar processing as the processing sequence.

By this processing, for example, it is possible to generate the correction image illustrated in FIG. 8(A2) explained above with reference to FIG. 8, that is, a correction image reflecting characteristics opposite to the lens distortion characteristics based on RGB wavelength light.

The above shows general processing of distortion correction processing based on wavelength dependence.

As explained above with reference to FIG. 3, even in an organic EL system or a liquid crystal system, almost all of a display panel has a configuration in which a color filter is arranged in the front surface of a white light source.

Regarding a displaying unit having such a configuration, unfortunately, outgoing light of a white light source leaks into a component of a color filter of a different color from the original output color. This is explained with reference to FIG. 13.

Figure 13:
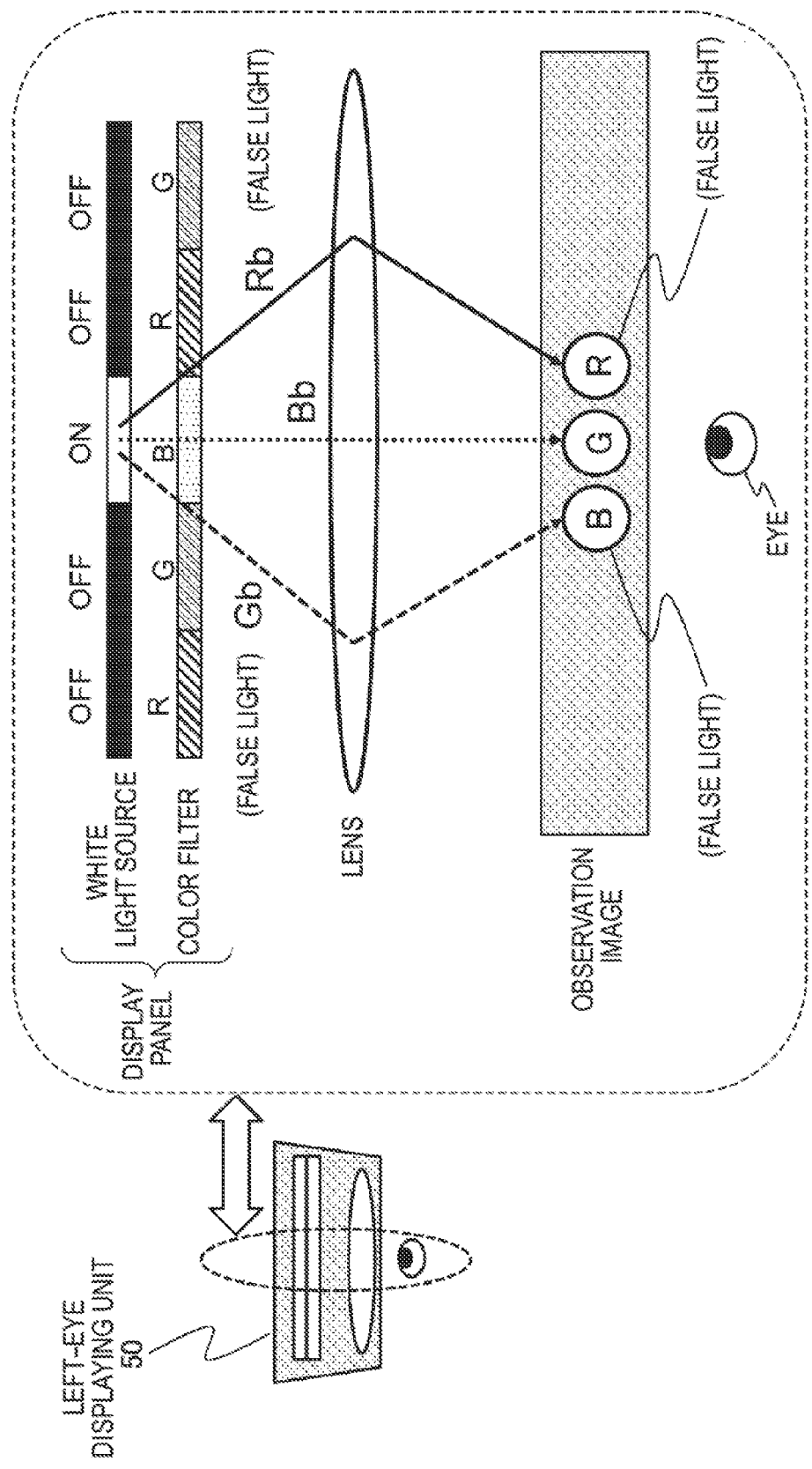
FIG. 13 is a diagram illustrating an occurrence of false light.

FIG. 13 illustrates a cross-sectional configuration of the same head mount display as in FIG. 3 explained above.

As explained above with reference to FIG. 3, there is provided a configuration in which a color filter is arranged in the front surface of a white light source.

In the example illustrated in FIG. 13, only the white light source on the background of the B (Blue) pixel position of the color filter is set to ON and its surroundings are set to OFF, so as to perform processing of generating a blue pixel output.

However, light from the white light source is circumferentially expanded and light irradiated in the oblique direction is collected by the lens through color filters (R and G) adjacent to the color filter (B) though which it should be passed.

As a result of this, the user (or observer) is caused to observe an image of a different color from that of the original image.

This false optical element is referred to as "false light" below. Also, a color, which occurs in an observation image due to this false light and is not included in the original image, is referred to as "color shift due to false light."

In the example illustrated in FIG. 13, Rb and Gb correspond to false elements.

Here, first characters "R" and "G" in the false signals "Rb" and "Gb" show color signals caused as false light and a subsequent character "b" shows an original filter color "B" corresponding to a color signal to be output. A signal "Bb" is a normal signal where both an output color element and a signal to be output are "B."

In a small display used in a head mount display, since the distance between a color filter and a white light source is relatively large, this false phenomenon becomes more significant.

This false phenomenon is a phenomenon that is not overcome even in the case of generating and outputting a correction image supporting the distortion characteristic of each color of RGB explained with reference to FIG. 7 to FIG. 12.

FIG. 14 is a diagram illustrating an occurrence aspect of color shift due to false light in the case of generating and outputting a correction image supporting the distortion characteristic of each color of RGB explained with reference to FIG. 8.

As illustrated in FIG. 14, for example, for the input image (A1) with respect to the image signal processing unit 70 of the head mount display 10 illustrated in FIG. 3, as illustrated in (A2), an image having characteristics opposite to the lens distortion characteristics unique to RGB wavelength light is generated as a correction image.

This correction image illustrated in FIG. 14(A2) is an image in which a characteristic opposite to the distortion characteristic of each color of RGB in FIG. 6(B) explained above is set for each of RGB.

When this correction image is output onto a display panel, as an observation image observed through the lens, blue, sky blue, yellow and red are output in addition to original white (W) as illustrated in FIG. 14(B). That is, an image on which color shift due to false light occurs is observed.

Figure 15:
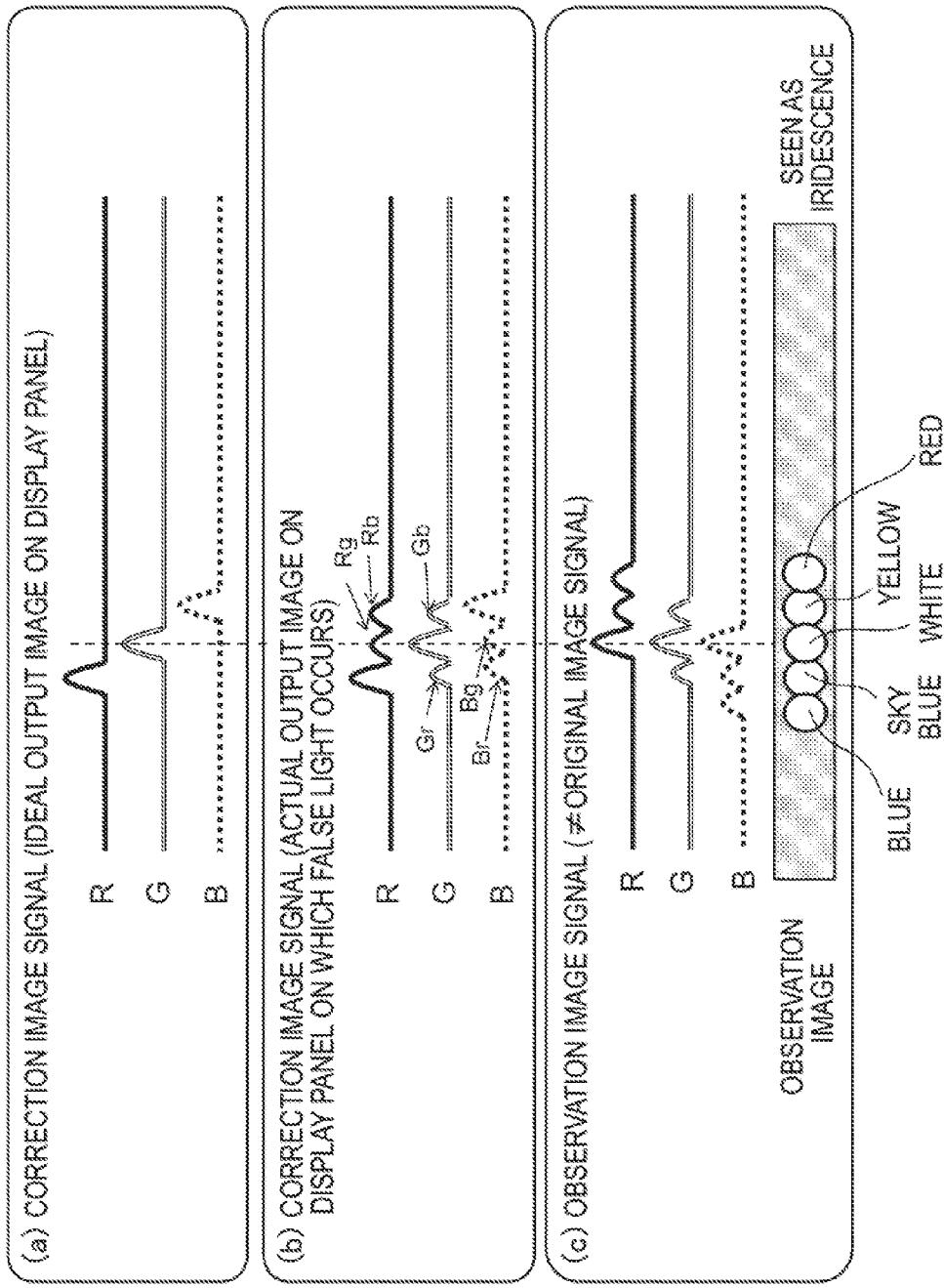
FIG. 15 is a diagram illustrating a problem of an observation image, which is caused by false light.

FIG. 15 is a diagram illustrating an occurrence aspect of false light based on a correction image signal supporting RGB and correspondence in an observation image.

FIG. 15(*a*) shows van ideal correction image signal without false light.

Also, the example illustrated in FIG. 15 is an output example of W pixels generated by an output, where the output is made by equal outputs of RGB.

FIG. 15(*b*) illustrates a correction image signal in which false light occurs. Actually, as explained with reference to FIG. 13, output light through colors near a color of the color filter that is an original light emission target occurs, and, as illustrated in FIG. 15(*b*), various signals supporting false light occur.

That is, the R signal includes false light signals Rg and Rb, the G signal includes false signals Gr and Gb, and the B signal includes false signals Br and Bg. Thus, these false light signals are included.

As a result of this, as illustrated in FIG. 15(*c*), in output processing of white (W) pixels, blue, sky blue, yellow and red are output near white (W). That is, an image in which color shift by false light occurs is observed.

2. Regarding Processing of Suppressing Occurrence of Color Shift by False Light In the following, an explanation is given to an image signal processing apparatus that performs processing of suppressing an occurrence of color shift due to false light explained with reference to FIG. 13 to FIG. 15.

2-1. Regarding Entire Configuration of Head Mount Display

Figure 16:
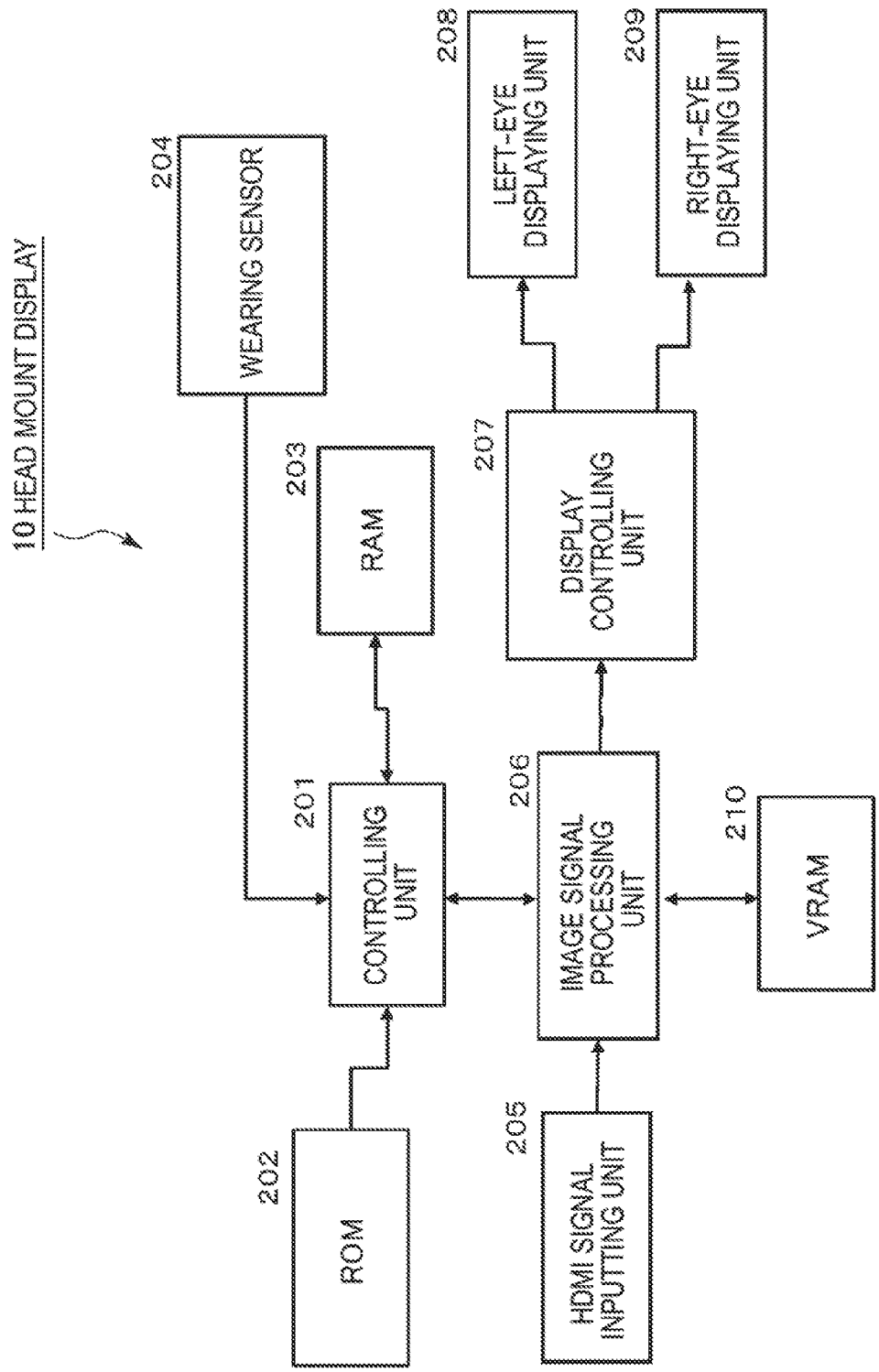
FIG. 16 is a diagram illustrating a configuration example of a head mount display as an example of an image signal processing apparatus of the present disclosure.

First, with reference to FIG. 16, an explanation is given to the entire configuration of the head mount display 10, which is an embodiment of an image signal processing apparatus of the present disclosure.

A controlling unit 201 includes a microprocessor, for example, and controls an operation of the entire apparatus by executing a control program stored in a ROM (Read Only Memory) 202 while using a RAM (Random Access Memory) 203 as a work area.

A wearing sensor 204 detects that the head mount display 10 is worn on the user (or observer) or the user takes off the head mount display 10. When detecting that the head mount display 10 is worn or taken off, the wearing sensor 204 produces a detection signal in the controlling unit 201.

Based on the detection signal, the controlling unit 201 issues a control instruction to start or stop processing with respect to an image signal processing unit 206.

The image signal processing unit 206 performs signal processing such as decoding, scaling and noise reduction on an image signal received from the front end box 40 in an HDMI signal inputting unit 205. Further, it performs generation processing of a correction image to suppress an occurrence of color shift based on lens distortion or false light.

The image signal subjected to processing is temporarily recorded in a VRAM (Video RAM) 210.

A display controlling unit 207 displays and outputs the image signal, which is temporarily recorded in the VRAM 210, to a left-eye displaying unit 208 and a right-eye displaying unit 209. The left-eye displaying unit 208 and the right-eye displaying unit 209 employ the configuration explained above with reference to FIG. 3 or FIG. 13, that is, a configuration including a display panel and a lens where the display panel includes a white light source and a color filter.

2-2. Regarding Details of Processing Performed by Image Signal Processing Unit Next, with reference to FIG. 17, a detailed explanation is given to processing performed by the image signal processing unit 206 in the head mount display 10 illustrated in FIG. 16.

As described above, the image signal processing unit 206 performs signal processing such as decoding, scaling and noise reduction on an image signal received from the front end box 40 in the HDMI signal inputting unit 205. Further, it performs generation processing of a correction image to suppress an occurrence of color shift based on lens distortion or false light.

The signal processing such as decoding, scaling and noise reduction is similar processing to that in the related art, and therefore a detailed explanation is given to generation processing of a correction image to suppress an occurrence of color shift based on lens distortion and false light.

Figure 17:
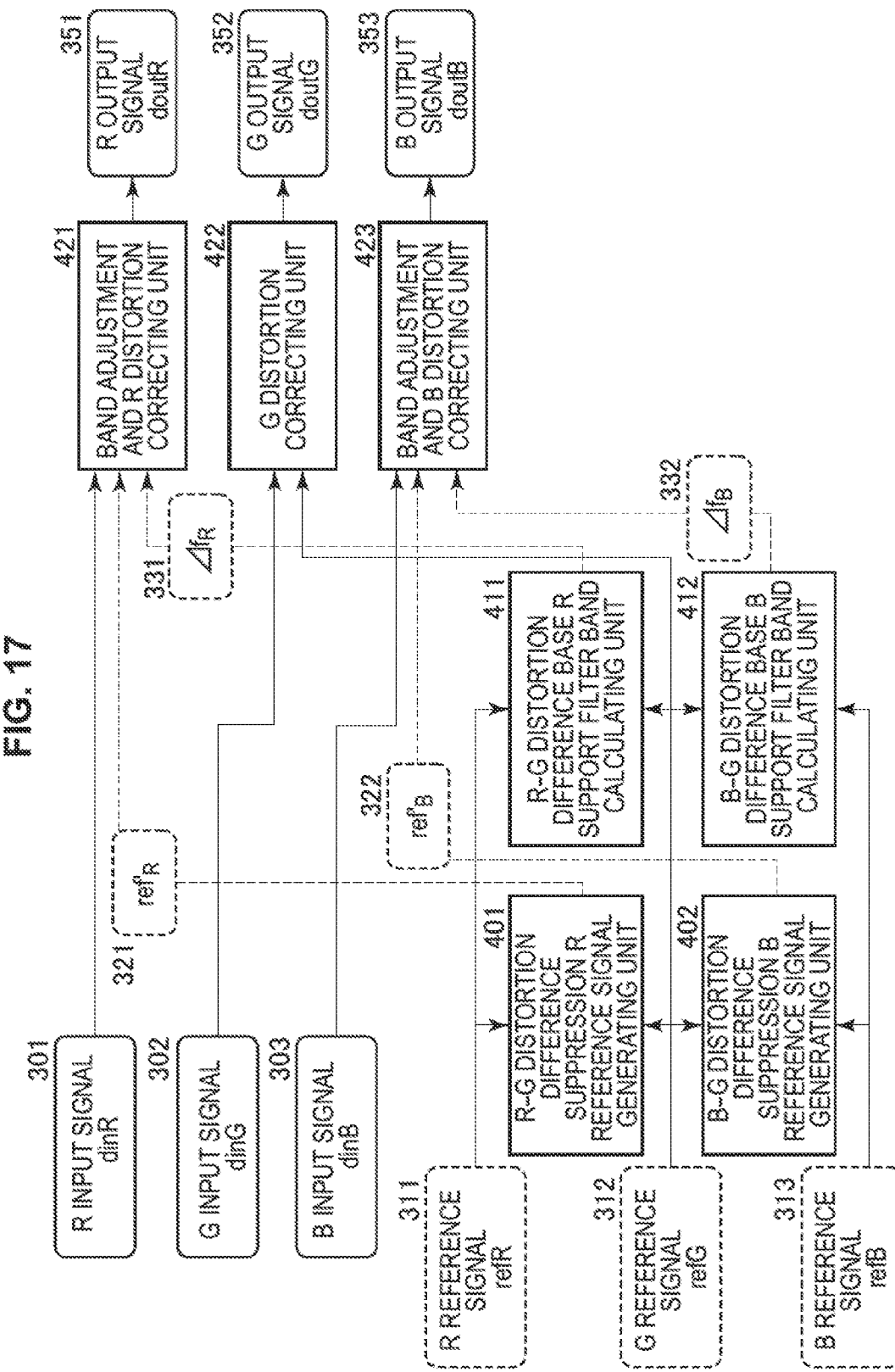
FIG. 17 is a diagram illustrating one configuration example of an image signal processing unit of an image signal processing apparatus of the present disclosure.

FIG. 17 is a diagram illustrating a system of generation processing of a correction image to suppress an occurrence of color shift based on lens distortion or false light, which is performed by the image signal processing unit 206.

Similar to the image processing system explained above with reference to FIG. 10, the configuration of the image processing unit illustrated in FIG. 17 includes distortion correcting unit 421 to 423 supporting colors, which generate correction images by performing correction supporting each color corresponding to the lens distortion characteristic of each RGB wavelength light.

However, in the configuration illustrated in FIG. 17, an R distortion correcting unit that performs distortion correction on R signals is configured as the band adjustment and R distortion correcting unit 421 that performs different processing from that in the configuration in FIG. 10.

Similarly, a B distortion correcting unit that performs distortion correction on B signals is configured as the band adjustment and B distortion correcting unit 423 that performs different processing from that in the configuration in FIG. 10.

A G distortion correcting unit that performs distortion correction on G signals is configured as the G distortion correcting unit 422 that performs similar processing to that in the configuration in FIG. 10.

Further, in the configuration illustrated in FIG. 17, the following components are added to suppress an occurrence of color shift based on false light.

Components of an R-G distortion difference suppression R reference signal generating unit 401, a B-G distortion difference suppression B reference signal generating unit 402, an R-G distortion difference base R support filter band calculating unit 411 and a B-G distortion difference base B support filter band calculating unit 412 are added.

The R-G distortion difference suppression R reference signal generating unit 401 receives an input of a parameter R reference signal refR311 based on the lens distortion characteristic of R signals and a parameter G reference signal refG312 based on the lens distortion characteristic of G signals, from a memory, generates a correction R reference signal ref'R321 and inputs the generated correction R reference signal ref'R321 in the band adjustment and R distortion correcting unit 421.

The B-G distortion difference suppression B reference signal generating unit 402 receives an input of a parameter B reference signal refB313 based on the lens distortion characteristic of B signals and the parameter G reference signal refG312 based on the lens distortion characteristic of G signals, from a memory, generates a correction B reference signal ref'B322 and inputs the generated correction R reference signal ref'R322 in the band adjustment and B distortion correcting unit 423.

The R-G distortion difference base R support filter band calculating unit 411 receives an input of the parameter R reference signal refR311 based on the lens distortion characteristic of R signals and the parameter G reference signal refG312 based on the lens distortion characteristic of G signals, from a memory, generates an R support filter band control signal $\Delta fR331$ and inputs the generated R support filter band control signal $\Delta fR331$ in the band adjustment and R distortion correcting unit 421.

The B-G distortion difference base B support filter band calculating unit 412 receives an input of the parameter B reference signal refB313 based on the lens distortion characteristic of B signals and the parameter G reference signal refG312 based on the lens distortion characteristic of G signals, from a memory, generates a B support filter band control signal ΔfB332 and inputs the generated B support filter band control signal ΔfB332 in the band adjustment and B distortion correcting unit 423.

Processing according to the configuration of the image signal processing unit 206 illustrated in FIG. 17 is explained.

The band adjustment and R distortion correcting unit 421 that performs distortion correction on R signals receives an input of an R input signal dinR301.

The G distortion correcting unit 422 that performs distortion correction on G signals receives an input of a G input signal dinG302.

The band adjustment and B distortion correcting unit 423 that performs distortion correction on B signals receives an input of a B input signal dinB303.

The input signal din denotes the pixel signal of each pixel forming a display image. It is an image signal input from the HDMI signal inputting unit 205 illustrated in FIG. 16 and denotes the pixel signal supporting each color of each image frame forming content input from the front end box 40 illustrated in, for example, FIG. 1 or FIG. 3.

Further, the band adjustment and R distortion correcting unit 421 receives an input of the correction R reference signal refR321 generated by the R-G distortion difference suppression R reference signal generating unit 401 and the R support filter band control signal ΔfR331 generated by the R-G distortion difference base R support filter band calculating unit 411.

Also, the G distortion correcting unit 422 receives an input of the G reference signal refG312 that is a reference signal supporting G signals.

Also, the band adjustment and B distortion correcting unit 423 receives an input of the correction B reference signal refB322 generated by the B-G distortion difference suppression B reference signal generating unit 402 and the B support filter band control signal ΔfB332 generated by the B-G distortion difference base B support filter band calculating unit 412.

The R reference signal refR311, the G reference signal refG312 and the B reference signal refB313 are signals similar to the reference signal explained above with reference to FIG. 10 and denote parameters based on the distortion characteristics of colors of the lens on the head mount display 10. They are stored in advance in the memory of the head mount display 10.

In the configuration explained with reference to FIG. 10, they are used as signals indicating pixel positions of input images to be referred to at the time of generating output signals dout in the RGB distortion correcting units 101 to 103.

In the configuration illustrated in FIG. 17, the G distortion correcting unit 422 performs the same processing as the processing explained with reference to FIG. 10 and FIG. 11. That is, it determines a pixel position of an input image to be referred to, according to the G reference signal refG312, and generates an output signal doutG.

The G distortion correcting unit 422 performs the same processing as the processing explained with reference to FIG. 10 and FIG. 11.

However, the band adjustment and R distortion correcting unit 421 that performs distortion correction on R signals and the band adjustment and B distortion correcting unit 423 that performs distortion correction on B signals perform different processing from the processing explained with reference to FIG. 10 and FIG. 11.

The distortion correcting units 421 to 423 supporting RGB colors illustrated in FIG. 17 receive an input of color signals of correction target images, perform the image distortion correction of colors based on lens distortion characteristics and generate correction images for the colors. Similar to the processing explained above with reference to FIG. 10 to FIG. 12, each of these distortion correcting units 421 to 423 supporting multiple colors performs processing of: receiving an input of a reference signal indicating a pixel position in an input image, which is applied to calculate each pixel value of an output correction image; and setting a pixel value of the pixel position of the input image, which is indicated by the reference signal, as an output pixel value.

However, in the configuration in FIG. 17, the distortion correcting unit supporting each color of R and B performs processing of: receiving an input of a correction reference signal in which a difference with the G reference signal refG is set to be small; applying this correction signal; and generating a correction image in which a pixel value of a pixel position indicated by the correction reference signal in an input image is set as an output pixel value.

This correction reference signal is generated in the R-G distortion difference suppression R reference signal generating unit 401 and the B-G distortion difference suppression B reference signal generating unit 402.

Processing performed by the R-G distortion difference suppression R reference signal generating unit 401 and processing performed by the B-G distortion difference suppression B reference signal generating unit 402 are explained with reference to FIG. 18.

As described above, the R-G distortion difference suppression R reference signal generating unit 401 receives an input of the parameter R reference signal refR311 based on the lens distortion characteristic of R signals and the parameter G reference signal refG312 based on the lens distortion characteristic of G signals, from a memory, generates the correction R reference signal refR321 and inputs the generated correction R reference signal refR321 in the band adjustment and R distortion correcting unit 421.

Also, the B-G distortion difference suppression B reference signal generating unit 402 receives an input of the parameter B reference signal refB313 based on the lens distortion characteristic of B signals and the parameter G reference signal refG312 based on the lens distortion characteristic of G signals, from a memory, generates the correction B reference signal refB322 and inputs the generated correction B reference signal refB322 in the band adjustment and B distortion correcting unit 423.

Figure 18:
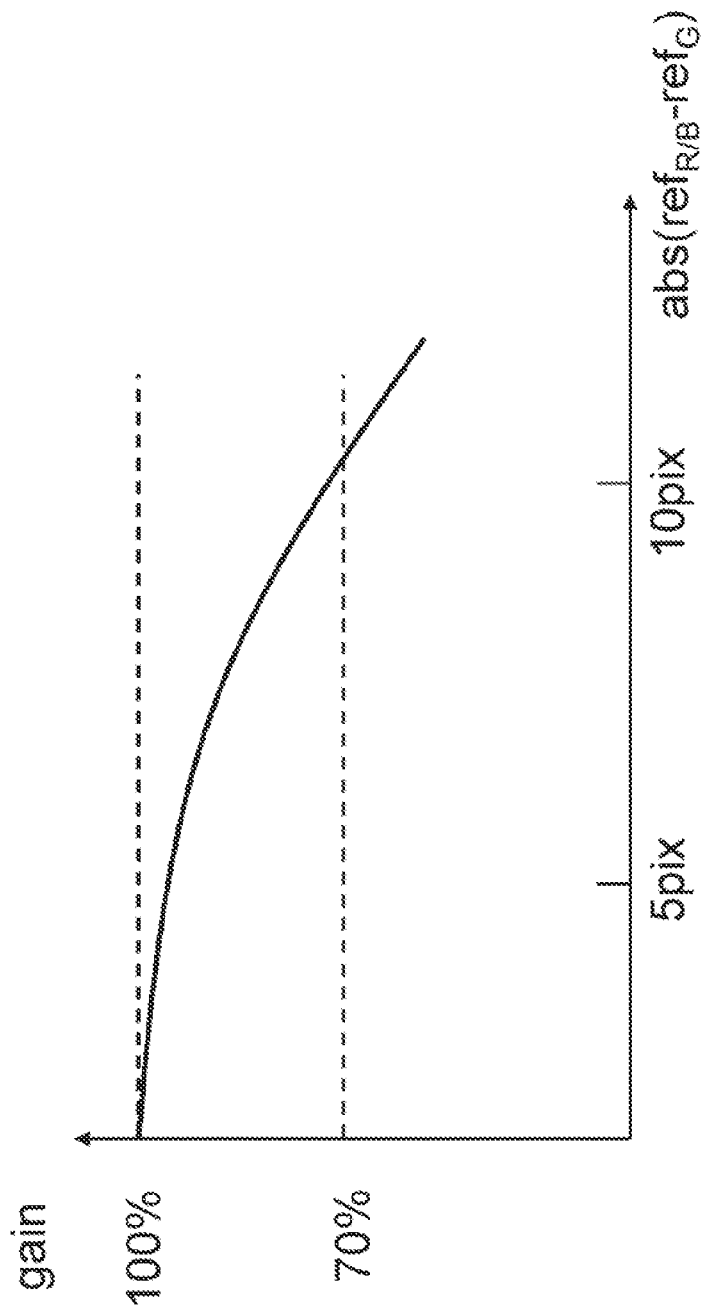
FIG. 18 is a diagram illustrating processing by a distortion difference suppression reference signal generating unit in an image signal processing unit of an image signal processing apparatus of the present disclosure.

FIG. 18 is a diagram illustrating processing performed by the R-G distortion difference suppression R reference signal generating unit 401 and the B-G distortion difference suppression B reference signal generating unit 402.

First, a processing example in the R-G distortion difference suppression R reference signal generating unit 401 is explained.

The R-G distortion difference suppression R reference signal generating unit 401 receives an input of the parameter R reference signal refR311 based on the lens distortion characteristic of R signals and the parameter G reference signal refG312 based on the lens distortion characteristic of G signals, from the memory, and calculates a difference absolute value.

$$\text{abs}(\text{ref}R - \text{ref}G)$$

According to the above equation, the difference absolute value between the R reference signal refR311 and the G reference signal refG312 is calculated.

This difference absolute value abs(refR−refG) corresponds to the horizontal axis of the graph illustrated in FIG. 18.

The R-G distortion difference suppression R reference signal generating unit 401 calculates the gain corresponding to the calculated difference absolute value abs(refR−refG) according to the graph illustrated in FIG. 18.

The graph illustrated in FIG. 18 shows correspondence data between the difference absolute value abs(refR−refG) and the gain, which is stored in the memory in the R-G distortion difference suppression R reference signal generating unit 401 or a storage unit such as the ROM 202 illustrated in FIG. 16.

The R-G distortion difference suppression R reference signal generating unit 401 refers to the correspondence data between the difference absolute value abs(refR−refG) and the gain, which is stored in the memory, and calculates the gain corresponding to the calculated difference absolute value abs(refR−refG).

Further, according to the calculated gain, the correction R reference signal refR321 is generated. The correction R reference signal refR321 performs the calculation according to following equation 1.

$$refR = refG + gain(refR - refG) \quad \text{(Equation 1)}$$

In the above equation 1, "refG" represents the G reference signal refG312 illustrated in FIG. 17 and "gain(refR−refG)" represents the gain value acquired based on the calculated difference absolute value abs(refR−refG) according to the graph illustrated in FIG. 18.

The R-G distortion difference suppression R reference signal generating unit 401 inputs the correction R reference signal refR321 generated as above, in the band adjustment and R distortion correcting unit 421.

The graph illustrated in FIG. 18 is set such that, as the difference between the G reference signal refG and the R reference signal refR is larger, a value of the R reference signal refR is closer to a position indicated by the G reference signal refG. In the example illustrated in this FIG. 18, when the difference absolute value abs(refR−refG) of the reference signal becomes 10 pixels, a gain of 70% is acquired.

For example, in a case where "abs(refR−refG)" is 10 pixels, the R-G distortion difference suppression R reference signal generating unit 401 generates the correction R reference signal refR321 in which a value of the R reference signal refR is rewritten such that the difference becomes 7 pixels, and inputs it in the band adjustment and R distortion correcting unit 421.

Next, a processing example in the B-G distortion difference suppression B reference signal generating unit 402 is explained.

The B-G distortion difference suppression B reference signal generating unit 402 receives an input of the parameter B reference signal refB313 based on the lens distortion characteristic of B signals and the parameter G reference signal refG312 based on the lens distortion characteristic of G signals, from the memory, and calculates a difference absolute value.

$$abs(refB - refG)$$

According to the above equation, the difference absolute value between the B reference signal refB313 and the G reference signal refG312 is calculated.

This difference absolute value abs(refB−refG) corresponds to the horizontal axis of the graph illustrated in FIG. 18.

The B-G distortion difference suppression B reference signal generating unit 402 calculates the gain corresponding to the calculated difference absolute value abs(refB−refG) according to the graph illustrated in FIG. 18.

The graph illustrated in FIG. 18 shows correspondence data between the difference absolute value abs(refB−refG) and the gain, which is stored in the memory in the B-G distortion difference suppression B reference signal generating unit 402 or a storage unit such as the ROM 202 illustrated in FIG. 16.

The B-G distortion difference suppression B reference signal generating unit 402 refers to the correspondence data between the difference absolute value abs(refB−refG) and the gain, which is stored in the memory, and calculates the gain corresponding to the calculated difference absolute value abs(refB−refG).

Further, according to the calculated gain, the correction B reference signal refB322 is generated. The correction B reference signal refB322 performs the calculation according to following equation 2.

$$refB = refG + gain(refB - refG) \quad \text{(Equation 2)}$$

In the above equation 2, "refG" represents the G reference signal refG312 illustrated in FIG. 17 and "gain(refB−refG)" represents the gain value acquired based on the calculated difference absolute value abs(refB−refG) according to the graph illustrated in FIG. 18.

The B-G distortion difference suppression B reference signal generating unit 402 inputs the correction B reference signal refB322 generated as above, in the band adjustment and B distortion correcting unit 423.

The graph illustrated in FIG. 18 is set such that, as the difference between the G reference signal refG and the B reference signal refB is larger, a value of the B reference signal refB is closer to a position indicated by the G reference signal refG. In the example illustrated in this FIG. 18, when the difference absolute value abs(refB−refG) of the reference signal becomes 10 pixels, a gain of 70% is acquired.

For example, in a case where "abs(refB−refG)" is 10 pixels, the B-G distortion difference suppression B reference signal generating unit 402 generates the correction B reference signal refB322 in which a value of the B reference signal refB is rewritten such that the difference becomes 7 pixels, and inputs it in the band adjustment and B distortion correcting unit 423.

Next, processing performed by the R-G distortion difference base R support filter band calculating unit 411 and the B-G distortion difference base B support filter band calculating unit 412 is explained with reference to FIG. 19.

As described above, the R-G distortion difference base R support filter band calculating unit 411 receives an input of the parameter R reference signal refR311 based on the lens distortion characteristic of R signals and the parameter G reference signal refG312 based on the lens distortion characteristic of G signals, from a memory, generates the R support filter band control signal ΔfR331 and inputs the generated R support filter band control signal ΔfR331 in the band adjustment and R distortion correcting unit 421.

Also, the B-G distortion difference base B support filter band calculating unit 412 receives an input of the parameter B reference signal refB313 based on the lens distortion characteristic of B signals and the parameter G reference signal refG312 based on the lens distortion characteristic of G signals, from a memory, generates the B support filter band control signal ΔfB332 and inputs the generated B support filter band control signal ΔfB332 in the band adjustment and B distortion correcting unit 423.

Figure 19:
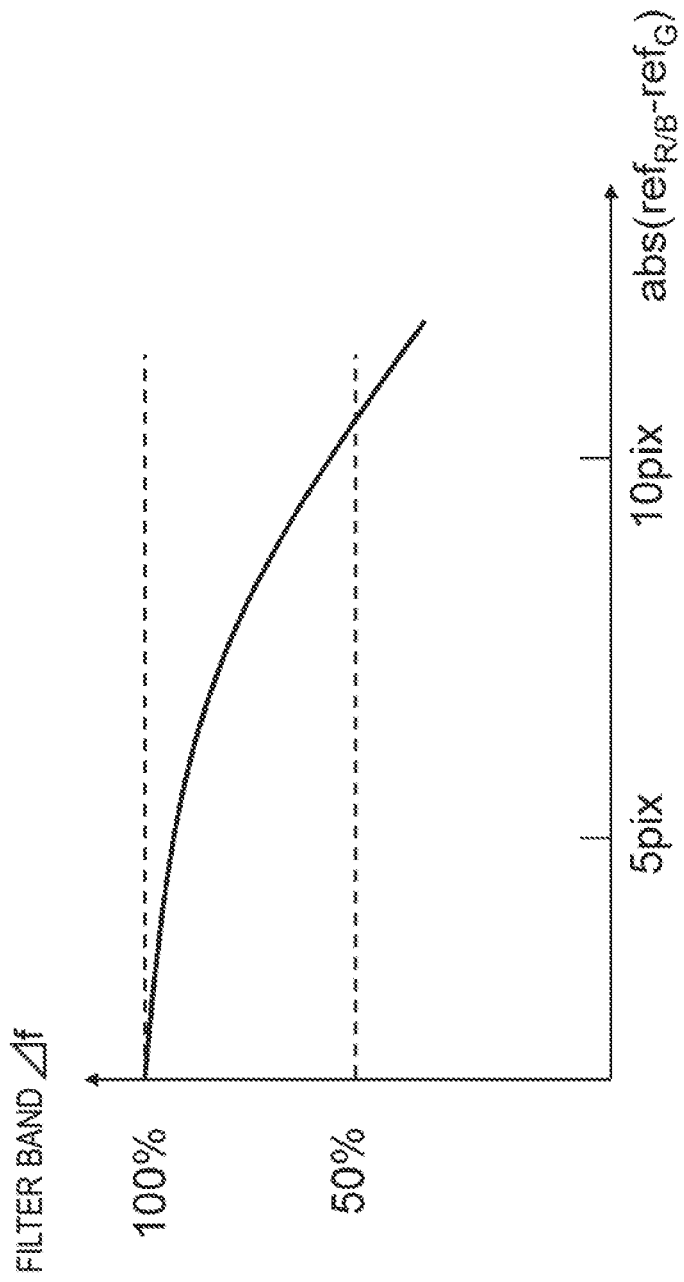
FIG. 19 is a diagram illustrating processing by a distortion difference base filter band calculating unit in an image signal processing unit of an image signal processing apparatus of the present disclosure.

FIG. 19 is a diagram illustrating processing performed by the R-G distortion difference base R support filter band calculating unit 411 and the B-G distortion difference base B support filter band calculating unit 412.

First, a processing example in the R-G distortion difference base R support filter band calculating unit 411 is explained.

The R-G distortion difference base R support filter band calculating unit 411 receives an input of the parameter R reference signal refR311 based on the lens distortion characteristic of R signals and the parameter G reference signal refG312 based on the lens distortion characteristic of G signals, from the memory, and calculates a difference absolute value.

$$abs(refR-refG)$$

According to the above equation, the difference absolute value between the R reference signal refR311 and the G reference signal refG312 is calculated.

This difference absolute value abs(refR−refG) corresponds to the horizontal axis of the graph illustrated in FIG. 19.

The R-G distortion difference base R support filter band calculating unit 411 calculates a filter band (ΔfR) corresponding to the calculated difference absolute value abs (refR−refG) according to the graph illustrated in FIG. 19.

The graph illustrated in FIG. 19 shows correspondence data between the difference absolute value abs(refR−refG) and the filter band (ΔfR), which is stored in the memory in the R-G distortion difference base R support filter band calculating unit 411 or a storage unit such as the ROM 202 illustrated in FIG. 16.

The R-G distortion difference base R support filter band calculating unit 411 refers to the correspondence data between the difference absolute value abs(refR−refG) and the filter band (ΔfR), which is stored in the memory, and calculates the filter band (ΔfR) corresponding to the calculated difference absolute value abs(refB−refG).

The R-G distortion difference base R support filter band calculating unit 411 inputs the filter band control signal (ΔfR) 331 generated as above, in the band adjustment and R distortion correcting unit 421.

The graph illustrated in FIG. 19 is set such that, as the difference between the G reference signal refG and the R reference signal refR is larger, the R filter band is reduced. In the example illustrated in this FIG. 19, when the difference between these reference signals becomes 10 pixels, a filter band of 50% is acquired.

For example, in a case where the difference between the G reference signal refG and the R reference signal refR is 10 pixels, the R-G distortion difference base R support filter band calculating unit 411 generates the filter band control signal (ΔfR) 331 with a value of 50%, and inputs it in the band adjustment and R distortion correcting unit 421.

Next, a processing example in the B-G distortion difference base B support filter band calculating unit 412 is explained.

The B-G distortion difference base B support filter band calculating unit 412 receives an input of the parameter B reference signal refB313 based on the lens distortion characteristic of B signals and the parameter G reference signal refG312 based on the lens distortion characteristic of G signals, from the memory, and calculates a difference absolute value.

$$abs(refB-refG)$$

According to the above equation, the difference absolute value between the B reference signal refB313 and the G reference signal refG312 is calculated.

This difference absolute value abs(refB−refG) corresponds to the horizontal axis of the graph illustrated in FIG. 19.

The B-G distortion difference base B support filter band calculating unit 412 calculates a filter band (ΔfB) corresponding to the calculated difference absolute value abs (refB−refG) according to the graph illustrated in FIG. 19.

The graph illustrated in FIG. 19 shows correspondence data between the difference absolute value abs(refB−refG) and the filter band (ΔfB), which is stored in the memory in the B-G distortion difference base B support filter band calculating unit 412 or a storage unit such as the ROM 202 illustrated in FIG. 16.

The B-G distortion difference base B support filter band calculating unit 412 refers to the correspondence data between the difference absolute value abs(refB−refG) and the filter band (ΔfB), which is stored in the memory, and calculates the filter band (ΔfB) corresponding to the calculated difference absolute value abs(refB−refG).

The B-G distortion difference base B support filter band calculating unit 412 inputs the filter band control signal (ΔfB) 332 generated as above, in the band adjustment and B distortion correcting unit 423.

The graph illustrated in FIG. 19 is set such that, as the difference between the G reference signal refG and the B reference signal refB is larger, the B filter band is reduced. In the example illustrated in this FIG. 19, when the difference between these reference signals becomes 10 pixels, a filter band of 50% is acquired.

For example, in a case where the difference between the G reference signal refG and the B reference signal refB is 10 pixels, the B-G distortion difference base B support filter band calculating unit 412 generates the filter band control signal (ΔfB) 332 with a value of 50%, and inputs it in the band adjustment and B distortion correcting unit 423.

Next, configurations and processing of the band adjustment and R distortion correcting unit 421 and the band adjustment and B distortion correcting unit 423 are explained with reference to FIG. 20.

In these two processing units, since only input parameters are different and substantially the same processing is performed, a configuration and processing example of the band adjustment and R distortion correcting unit 421 are explained as a representative example.

Figure 20:
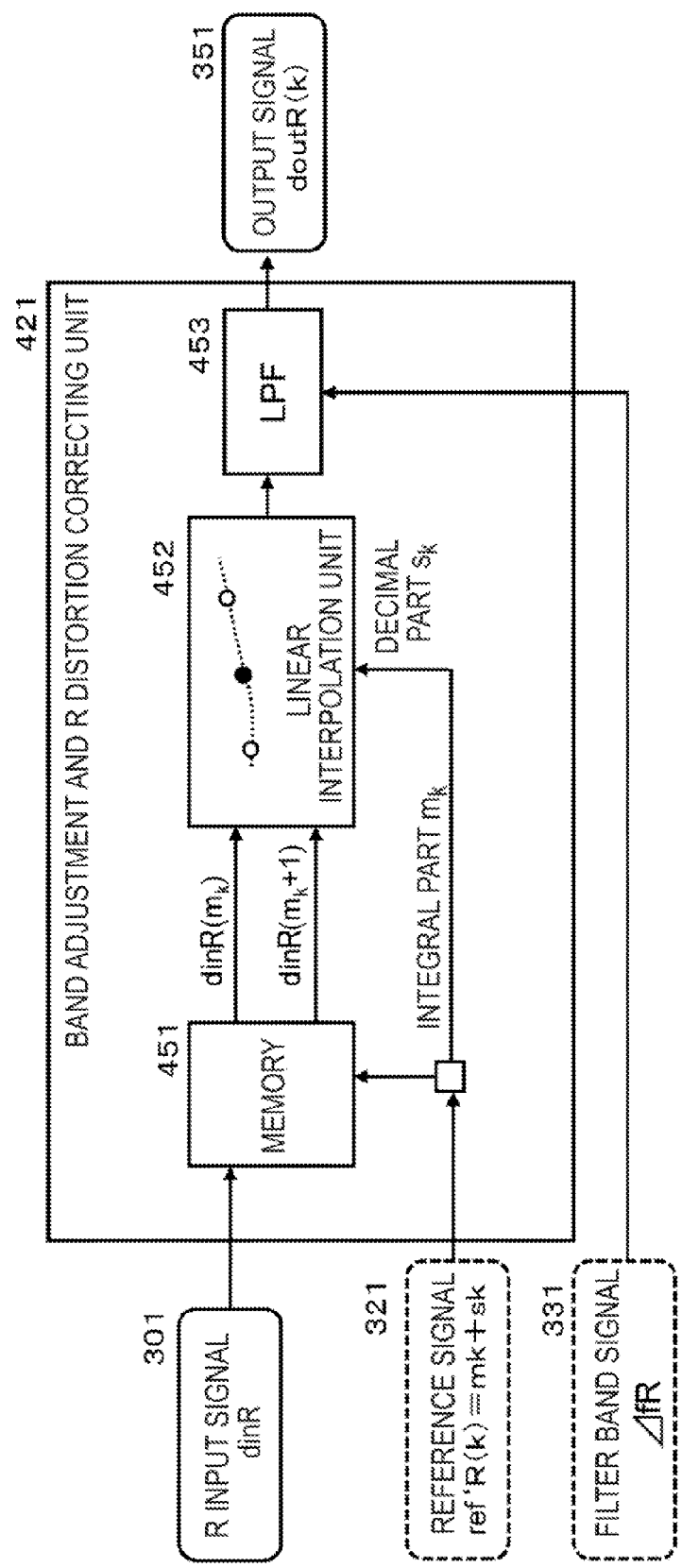
FIG. 20 is a diagram illustrating band adjustment by an image signal processing unit of an image signal processing apparatus of the present disclosure and a configuration and processing by an R distortion correcting unit.

FIG. 20 illustrates a configuration of the band adjustment and R distortion correcting unit 421. This configuration is a configuration adding a low-pass filter (LPF) 453 to the configuration of the R distortion correcting unit 101 explained above with reference to FIG. 11.

The low-pass filter (LPF) 453 receives the filter band control signal ΔfR331, performs band limitation on a generation signal of a linear interpolation unit 452, specifically, performs band limitation processing of reducing high-pass signals, and generates an output image signal doutR351.

Figure 21:
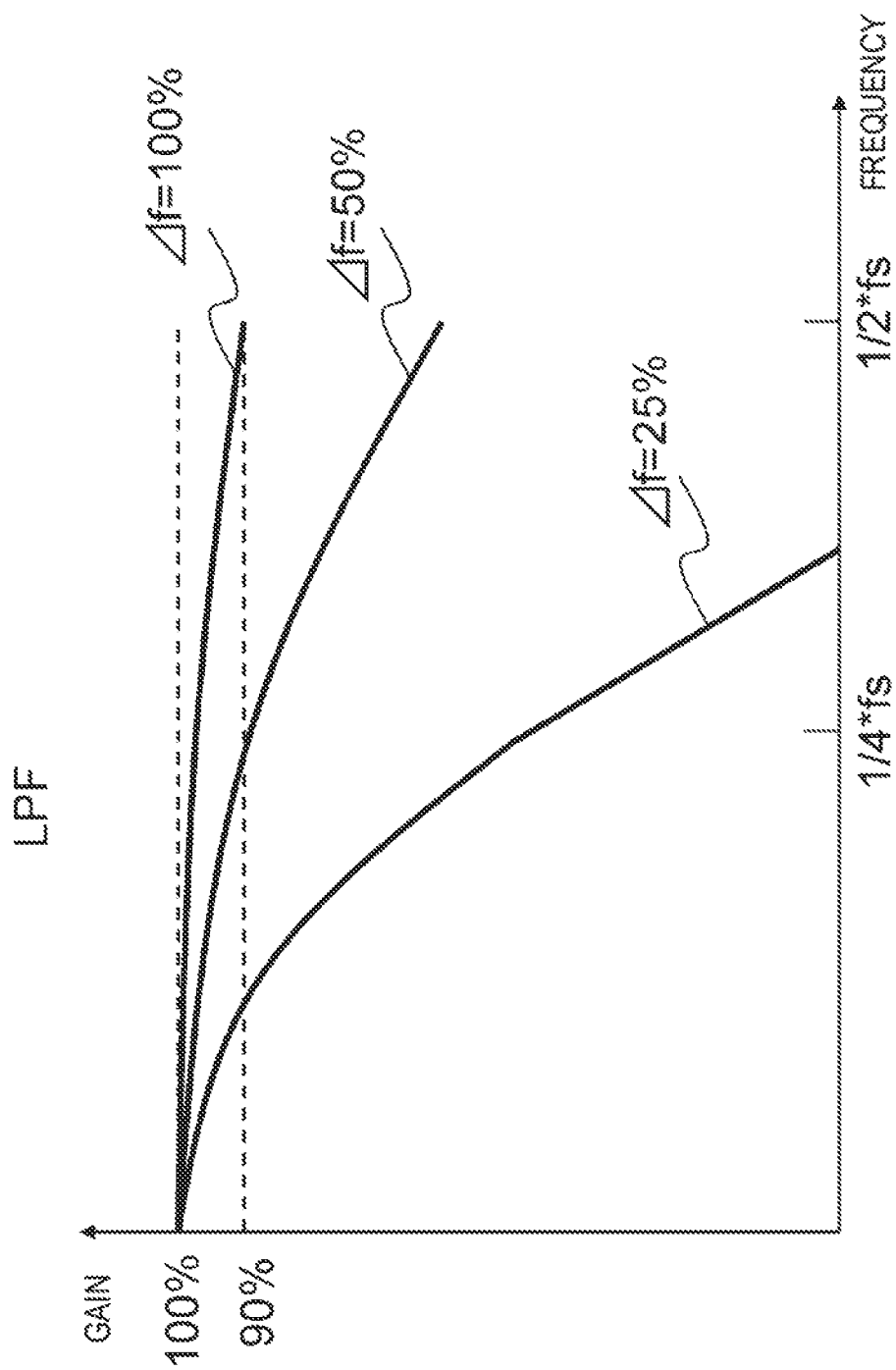
FIG. 21 is a diagram illustrating band adjustment by an image signal processing unit of an image signal processing apparatus of the present disclosure and low-pass filter application processing by an R distortion correcting unit.

FIG. 21 is a graph showing an example of band limitation in the low-pass filter (LPF) 453.

For example, if a band control signal input in the band adjustment and R distortion correcting unit 421 is ΔfR=100%, the entire frequency gain is set to 100%, but, as the input band control signal Δf decreases to 50%, 25%, and so on, processing of reducing the high-pass gain is performed and the output image signal doutR351 with the reduced high-pass gain is output.

With reference to the configuration of the band adjustment and R distortion correcting unit 421 illustrated in FIG. 20, processing performed by the band adjustment and R distortion correcting unit 421 is explained.

In the following, for ease of explanation, an explanation is given with an assumption that, based on a pixel value of an input pixel, the band adjustment and R distortion correcting unit 421 performs interpolation processing of calculating a pixel value of a position shifted only in the horizontal direction. Here, an explanation is given with an assumption that linear interpolation is applied as the interpolation method. Also, although there is a case where two-dimensional interpolation processing in the horizontal and vertical directions or multi-tap interpolation processing such as cubic interpolation is performed, these items of processing can be realized by expanding processing in the one-dimensional direction explained below to the two-dimensional direction, and basic processing denotes processing based on the following explanation.

In the band adjustment and R distortion correcting unit 421, following various signals are input.

(1) R input signal dinR301 corresponding to an R pixel value of an image corresponding to content to be displayed (2) Correction R reference signal refR321 generated by the R-G distortion difference suppression R reference signal generating unit 401

(3) R support filter band control signal $\Delta fR$331 generated by the R-G distortion difference base R support filter band calculating unit 411

These signals are input.

The correction R reference signal refR321 generated by the R-G distortion difference suppression R reference signal generating unit 401 denotes, for example, a correction reference signal acquired by correcting the original reference signal refR according to the graph characteristic illustrated in FIG. 18.

The correction R reference signal refR(k) 321 denotes a correction reference signal for correction according to the graph characteristic illustrated in FIG. 18 based on the original reference signal refR(k) selected according to the k-th output signal dout(k) output by the band adjustment and R distortion correcting unit 421.

The linear interpolation unit 452 of the band adjustment and R distortion correcting unit 421 applies this correction reference signal refR(k) 321 and determines a reference pixel position corresponding to an output signal.

Similar to the original reference signal refR(k), the correction R reference signal refR(k) 321 is not limited to an integral number matching a pixel interval. Therefore, the integral part of the correction R reference signal refR(k) 321 is referred to as "mk" and its decimal part is referred to as "sk."

For example, this example is an example using only pixels in the horizontal direction, and "mk" corresponds to pixel numbers 1, 2, 3, 4, 5, and so on, set in order from pixels in the left side of the horizontal pixel line.

In FIG. 20, the R input image dinR is sequentially stored in a memory 451.

From the memory 451, according to a value of mk in the correction R reference signal refR(k)=mk+sk, pixel values dinR(mk) and dinR(mk+1) of the input image to be referred to, to calculate the k-th output signal doutR(k) output by the band adjustment and R distortion correcting unit 421, are acquired.

By performing linear interpolation on these pixel values dinR(mk) and dinR(mk+1) of the input image by the value of the decimal part sk in the correction R reference signal refR(k)=mk+sk, the linear interpolation unit 452 calculates a pixel value of a pixel position in the original input image (i.e. pixel position indicated by the correction R reference signal refR(k)=mk+sk) to be set as a pixel value of the output image signal doutR(k).

This processing is similar to the processing explained above with reference to FIG. 12.

By interpolation processing using these R pixel values dinR(mk) and dinR(mk+1) of the input image, the linear interpolation unit 452 calculates a pixel value X(k) corresponding to the pixel position indicated by the correction R reference signal refR(k)=mk+sk (i.e. pixel position of the pixel 121 illustrated in FIG. 12(A)). This calculated pixel value is output to the low-pass filter (LPF) 453.

The linear interpolation unit 452 calculates the output pixel value X(k) in the following equation.

$$X(k)=(1-sk)\times dinR(mk)+(sk)\times dinR(mk)$$

The linear interpolation unit 452 calculates the output pixel value X(k) output to the low-pass filter (LPF) 453 according to the above equation.

The low-pass filter (LPF) 453 performs band limitation processing based on the R support filter band limitation signal $\Delta fR$331 generated by the R-G distortion difference base R support filter band calculating unit 411, on the pixel value X(k) output from the linear interpolation unit 452, specifically, performs processing of reducing high-pass signals, and generates and outputs the output signal doutR(k) 351.

As explained above, the band limitation in the low-pass filter (LPF) 453 is performed, for example, according to the graph illustrated in FIG. 21, based on the R support filter band control signal $\Delta fR$ 331. For example, if a band control signal input in the band adjustment and R distortion correcting unit 421 is $\Delta fR$=100%, the entire frequency gain is set to 100%, but, as the input band control signal $\Delta f$ decreases to 50%, 25%, and so on, processing of reducing the high-pass gain is performed and the output image signal doutR(k)351 with the reduced high-pass gain is output.

With reference to FIG. 20, processing in the band adjustment and R distortion correcting unit 421 that performs processing supporting R signals has been explained.

The band adjustment and B distortion correcting unit 423 that performs processing supporting B signals receives an input of signals of: (1) the B input signal dinB303 corresponding to a B pixel value of an image corresponding to content to be displayed; (2) the correction B reference signal refB322 generated by the B-G distortion difference suppression B reference signal generating unit 402; and (3) the B support filter band control signal $\Delta fB$332 generated by the B-G distortion difference base B support filter band calculating unit 412, performs processing similar to the processing explained with reference to FIG. 20 and outputs the output image signal doutB(k)353.

2-3. Regarding Effects Based on Application of Correction Reference Signal and Application of Low-Pass Filter Next, effects of the following processing performed in the band adjustment and R distortion correcting unit 421 and the band adjustment and B distortion correcting unit 423 are explained. That is, an explanation is given to (1) an effect applying correction reference signals refR and refB and (2) an effect of band limitation processing applying filter band control signals $\Delta fR$ and $\Delta fB$.

Figure 22:
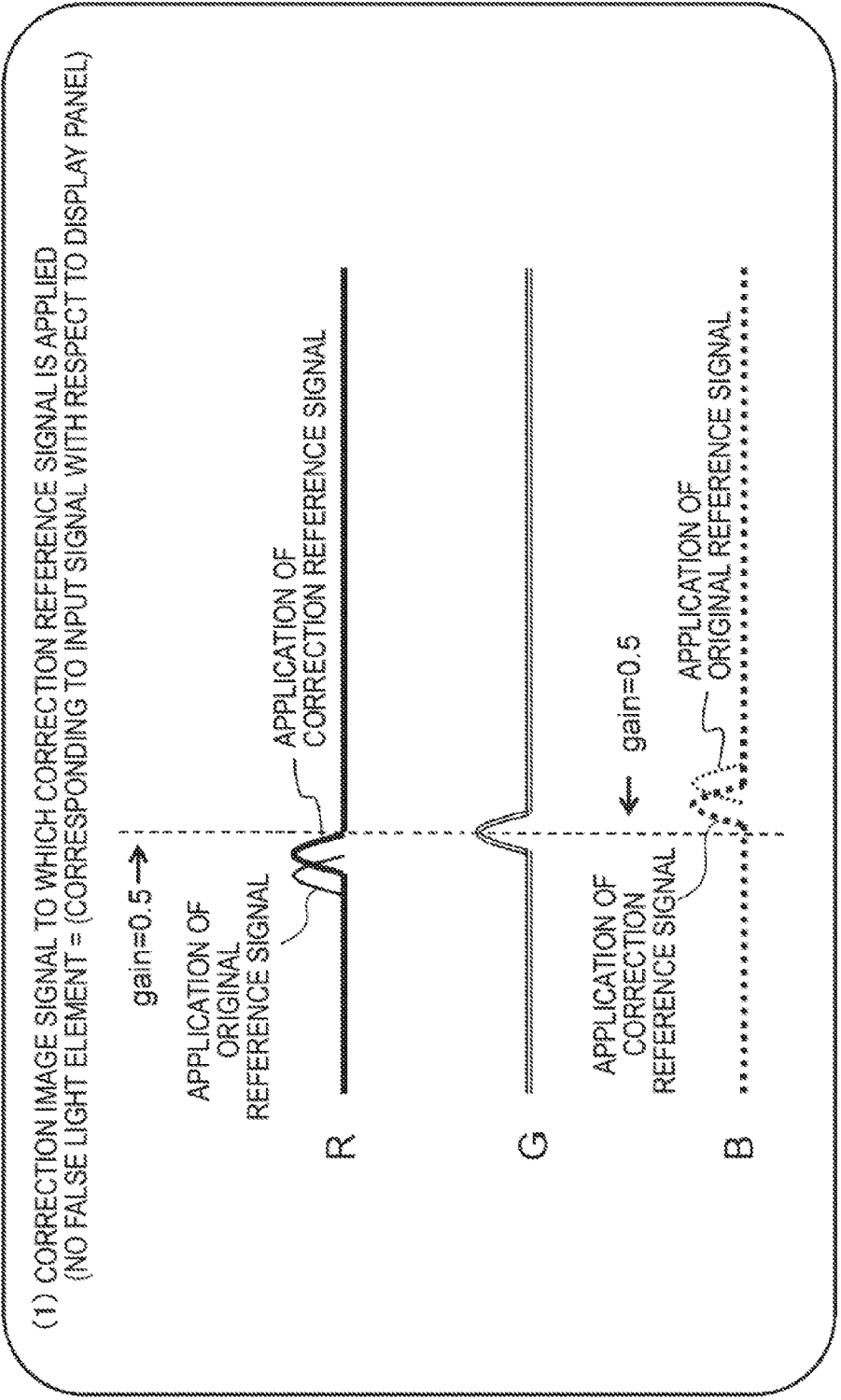
FIG. 22 is a diagram illustrating effects of band adjustment by an image signal processing unit of an image signal processing apparatus of the present disclosure and processing performed by an R distortion correcting unit.

FIG. 22 is a diagram illustrating effects of applying the correction reference signals refR and refB generated by the R-G distortion difference suppression R reference signal generating unit 401 and the B-G distortion difference suppression B reference signal generating unit 402.

FIG. 22 illustrates the following diagram.

(1) Correction image signal to which correction reference signal is applied (no false light element=(corresponding to input signal with respect to display panel)

FIG. 22(1) illustrates signal waveforms of RB in a case where the correction reference signals refR and refB are applied, and further illustrates signal waveforms in a case where the original reference signals refR and refB before amendment are applied.

Also, signal waveforms of RGB signals explained below are examples of pixel signals in which the output pixel value is set to W (White).

As illustrated in FIG. 22(1), regarding the R signal, the shift amount of the R signal with respect to the G signal is set smaller in a case where the correction reference signal refR is applied than a case where the original reference signal refR is applied.

Similarly, regarding the B signal, the shift amount of the B signal with respect to the G signal is set smaller in a case where the correction reference signal refB is applied than a case where the original reference signal refB is applied.

Also, the example illustrated in the figure is an example in the case of a gain of 50% calculated by the graph illustrated in FIG. 18, and the shift amounts of the RB signals with respect to the G signal decrease to the half, compared to a case where the original reference signal is applied.

FIG. 23 is a diagram illustrating an example of an image observed through a lens, where the image applies a correction image signal to which such a correction reference signal is applied and the image is output to a displaying unit.

FIG. 23 illustrates the following diagrams.

(2) Correction image signal to which correction reference signal is applied (false light element is present=(corresponding to output signal of display panel))

(3) Observation image signal.

As explained above with reference to FIG. 13 or the like, by false light caused by expanding irradiated light of the display panel to the surrounding pixels of a target color filter pixel, unrequested signal light is observed.

FIG. 23(2) illustrates an example of signal light corresponding to observation light including this false light.

This FIG. 23(2) is a diagram corresponding to FIG. 15(b) explained above.

Regarding the signals illustrated in this FIG. 23(2), compared to FIG. 15(b) explained above, an output signal area of the R signal shifts to the right side and an output signal area of the B signal shifts to the left side.

This is caused by adjusting the shift amount applying the correction reference signal illustrated in FIG. 22(1).

By this processing, as illustrated in FIG. 23(3), compared to the observation image signal explained above with reference to FIG. 15(c) (i.e. the observation image signal illustrated as a reference of FIG. 23(3)), the observation image signal has a narrow luminous area of false light and false light is less mixed.

Further, in the configuration of the present disclosure, after application processing of this correction reference signal, an output signal is generated by applying a low-pass filter to R and B signals.

An effect of application processing of this low-pass filter is explained with reference to FIG. 24 and FIG. 25.

Figure 24:
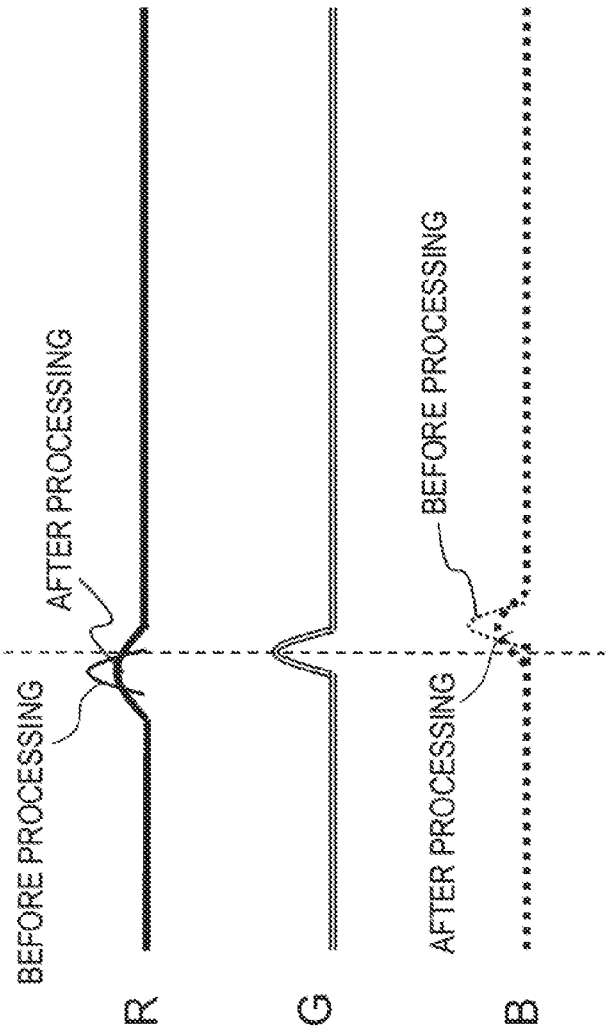
FIG. 24 is a diagram illustrating effects of band adjustment by an image signal processing unit of an image signal processing apparatus of the present disclosure and processing performed by an R distortion correcting unit.

FIG. 24(1) illustrates a signal example after applying the low-pass filter (LPF) to RGB signals generated by linear interpolation processing applying the correction reference signal explained with reference to FIG. 22. That is, it illustrates the following signal.

(1) Correction image signal to which correction reference signal and LPF are applied (no false light element=(corresponding to input signal with respect to display panel))

The example illustrated in this figure is an example with a filter band control signal $\Delta f$ of 50%. By this LPF application processing, a signal change becomes mild in each of R and B signals, and gentle signal waveforms are provided. As a result of this, false light GR, false light GB, false light RB and false light BR caused based on these R and B signals subsequently become gentle and are substantially lost. Further, false light RG and false light BG caused by the G signal are also absolved into light with gentle R and B. Since the human visual sensitivity is low with respect to the B and R signals, as a result, they are recognized to the extent that RGB are slightly separated from each other by visual contact.

FIG. 25 is a diagram illustrating an example of an image observed through a lens, in which a correction image signal generated by performing band control applying a correction reference signal and a filter band control signal is output to a displaying unit.

FIG. 25 illustrates the following drawings.

(2) Correction image signal to which correction reference signal and LPF are applied (false light element is present= (corresponding to output signal of display panel))

(3) Observation image signal

By application of the correction reference signal, a false light occurrence area is narrowed, and, furthermore, by LPF application processing, a signal change becomes mild in each of R and B signals and the false light level decreases. Compared to an observation image generated using the original reference signal illustrated in FIG. 15(c) without a false light countermeasure illustrated as a (reference) of FIG. 25(3), it is possible to observe an image with a smaller false light area and a lower false light level.

3. Summary of the Present Disclosure

Embodiments of the present disclosure have been explained above in detail with reference to specific embodiments. However, it is clear that amendments and substitution are possible by those skilled in the art without departing from the scope of the present disclosure. That is, the present disclosure is disclosed in a format of exemplification and should not be limitedly interpreted. To decide the gist of the present disclosure, the claims should be referred to.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image signal processing apparatus including:

multiple color support distortion correcting units receiving a color signal of a correction target image, performing image distortion correction of a color based on a lens distortion characteristic and generating a correction image supporting the color, wherein each of the multiple color support distortion correcting units performs processing of receiving a reference signal indicating a pixel position in an input image applied to calculate a pixel value of an output correction image, and setting a pixel value of the pixel position indicated by the reference signal in the input image as an output pixel value, and wherein at least one of the multiple color support distortion correcting units performs processing of applying a correction reference signal, which is set to have a small difference with another color reference signal, and generating a correction image in which a pixel value of a pixel position indicated by the correction reference signal in the input image is set as an output pixel value.

(2) The image signal processing apparatus according to (1), further including:

a distortion difference suppression reference signal generating unit calculating a difference absolute value between reference signals of two different colors, applying a correction amount determined according to the calculated difference absolute value and generating a correction reference signal supporting one of the two different colors, wherein the color support distortion correcting unit applying the correction reference signal performs processing of applying the correction reference signal generated by the distortion difference suppression reference signal generating unit.

(3) The image signal processing apparatus according to (2), wherein the distortion difference suppression reference signal generating unit generates a correction reference signal in which a difference between the reference signals of the two different colors is set to be small.

(4) The image signal processing apparatus according to (2) or (3), wherein the distortion difference suppression reference signal generating unit generates a correction reference signal in which, as the difference absolute value between the reference signals of the two different colors is larger, a difference reduction amount with the reference signals of the two different colors is set to be larger.

(5) The image signal processing apparatus according to any one of (1) to (4), wherein the color support distortion correcting unit applying the correction reference signal further generates the correction image by performing high-pass reduction processing on an image signal including a pixel value calculated by applying a correction reference signal.

(6) The image signal processing apparatus according to (5), further including:

a filter band calculating unit calculating a difference absolute value between reference signals of two different colors and generating a filter band control signal to perform the high-pass reduction processing according to the calculated difference absolute value, wherein the color support distortion correcting unit applying the correction reference signal generates the correction image by performing high-pass reduction processing according to the filter band control signal calculated by the filter band calculating unit.

(7) The image signal processing apparatus according to (6), wherein the filter band calculating unit generates a filter band control signal in which, as the difference absolute value between the reference signals of the two different colors is larger, a high-pass reduction rate is set to be higher.

(8) The image signal processing apparatus according to any one of (1) to (7), wherein, by linear interpolation processing, the color support distortion correcting unit generates a correction image in which a pixel value of a pixel position indicated by a reference signal or correction reference signal in an input image is set as an output pixel value.

(9) The image signal processing apparatus according to any one of (1) to (8), wherein the multiple color support distortion correcting units include an R distortion correcting unit receiving an R signal of the correction target image and generating and outputting a correction image supporting the R signal, a G distortion correcting unit receiving a G signal of the correction target image and generating and outputting a correction image supporting the G signal, and a B distortion correcting unit receiving a B signal of the correction target image and generating and outputting a correction image supporting the B signal.

(10) The image signal processing apparatus according to (9), wherein only the R distortion correcting unit and the B distortion correcting unit generate a correction image in which a pixel value of a pixel position indicated by the correction reference signal in an input image is set as an output pixel value.

(11) The image signal processing apparatus according to (9) or (10), wherein only the R distortion correcting unit and the B distortion correcting unit generate the correction image by performing high-pass reduction processing on an image signal including a pixel value calculated by applying a correction reference signal.

(12) A head mount display apparatus including:

an image signal processing unit performing image signal processing according to any one of (1) to (11).

Further, a method of processing performed in the above apparatus and system and a program to execute the processing are included in the configuration of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

As explained above, according to a configuration of an embodiment of the present disclosure, there is realized a configuration that can suppress the image distortion of each color based on lens distortion and color shift due to false light caused by white light scattering of a display panel.

To be more specific, it includes multiple color support distortion correcting units receiving each color signal of a correction target image, performing image distortion correction of each color based on a lens distortion characteristic and generating the correction image of each color. Each of the multiple color support distortion correcting units receives an input of a reference signal indicating a pixel position in an input image applied to calculate each pixel value of an output correction image, and sets a pixel value of the pixel position indicated by the reference signal in the input image as an output pixel value. At least one of the multiple color support distortion correcting units applies a correction reference signal, which is set to have a small difference with other color reference signals, sets a pixel value of a pixel position indicated by the correction reference signal in the input image as an output pixel value, and further generates and outputs a correction image to which band control as high-pass reduction processing is applied.

By the configuration, there is realized a configuration that can suppress the image distortion of each color based on lens distortion and color shift due to false light caused by white light scattering of a display panel.

What is claimed is:

1. An image signal processing apparatus comprising:
multiple color support distortion correcting units receiving a color signal of a correction target image, performing image distortion correction of a color based on a lens distortion characteristic and generating a correction image supporting the color,
wherein each of the multiple color support distortion correcting units performs processing of receiving a reference signal indicating a pixel position in an input image applied to calculate a pixel value of an output correction image, and setting a pixel value of the pixel position indicated by the reference signal in the input image as an output pixel value, and
wherein at least one of the multiple color support distortion correcting units performs processing of applying a correction reference signal, which is set to have a small difference with another color reference signal, and generating a correction image in which a pixel value of a pixel position indicated by the correction reference signal in the input image is set as an output pixel value.

2. The image signal processing apparatus according to claim 1, further comprising:
a distortion difference suppression reference signal generating unit calculating a difference absolute value between reference signals of two different colors, applying a correction amount determined according to the calculated difference absolute value and generating a correction reference signal supporting one of the two different colors,
wherein the color support distortion correcting unit applying the correction reference signal performs processing of applying the correction reference signal generated by the distortion difference suppression reference signal generating unit.

3. The image signal processing apparatus according to claim 2, wherein the distortion difference suppression reference signal generating unit generates a correction reference signal in which a difference between the reference signals of the two different colors is set to be small.

4. The image signal processing apparatus according to claim 2, wherein the distortion difference suppression reference signal generating unit generates a correction reference signal in which, as the difference absolute value between the reference signals of the two different colors is larger, a difference reduction amount with the reference signals of the two different colors is set to be larger.

5. The image signal processing apparatus according to claim 1, wherein the color support distortion correcting unit applying the correction reference signal further generates the correction image by performing high-pass reduction processing on an image signal including a pixel value calculated by applying a correction reference signal.

6. The image signal processing apparatus according to claim 5, further comprising:
a filter band calculating unit calculating a difference absolute value between reference signals of two different colors and generating a filter band control signal to perform the high-pass reduction processing according to the calculated difference absolute value,
wherein the color support distortion correcting unit applying the correction reference signal generates the correction image by performing high-pass reduction processing according to the filter band control signal calculated by the filter band calculating unit.

7. The image signal processing apparatus according to claim 6, wherein the filter band calculating unit generates a filter band control signal in which, as the difference absolute value between the reference signals of the two different colors is larger, a high-pass reduction rate is set to be higher.

8. The image signal processing apparatus according to claim 1, wherein, by linear interpolation processing, the color support distortion correcting unit generates a correction image in which a pixel value of a pixel position indicated by a reference signal or correction reference signal in an input image is set as an output pixel value.

9. The image signal processing apparatus according to claim 1,
wherein the multiple color support distortion correcting units include
an R distortion correcting unit receiving an R signal of the correction target image and generating and outputting a correction image supporting the R signal,
a G distortion correcting unit receiving a G signal of the correction target image and generating and outputting a correction image supporting the G signal, and
a B distortion correcting unit receiving a B signal of the correction target image and generating and outputting a correction image supporting the B signal.

10. The image signal processing apparatus according to claim 9, wherein only the R distortion correcting unit and the B distortion correcting unit generate a correction image in which a pixel value of a pixel position indicated by the correction reference signal in an input image is set as an output pixel value.

11. The image signal processing apparatus according to claim 10, wherein only the R distortion correcting unit and the B distortion correcting unit generate the correction image by performing high-pass reduction processing on an image signal including a pixel value calculated by applying a correction reference signal.

12. A head mount display apparatus comprising:
an image signal processing unit performing image signal processing according to claim 1.

* * * * *